US011533127B1

(12) United States Patent
Yu et al.

(10) Patent No.: US 11,533,127 B1
(45) Date of Patent: Dec. 20, 2022

(54) DETERMINING DATA AVAILABILITY

(71) Applicant: Kaleidoscope Blockchain, Inc., Champaign, IL (US)

(72) Inventors: Mingchao Yu, Sydney (AU); Sreeram Kannan, Redmond, WA (US); Pramod Viswanath, Champaign, IL (US); Songze Li, Palo Alto, CA (US); Amir Salman Avestimehr, Rancho Palos Verdes, CA (US)

(73) Assignee: Kaleidoscope Blockchain, Inc., Champaign, IL (US)

( * ) Notice: Subject to any disclaimer, the term of this patent is extended or adjusted under 35 U.S.C. 154(b) by 407 days.

(21) Appl. No.: 16/776,291

(22) Filed: Jan. 29, 2020

Related U.S. Application Data

(60) Provisional application No. 62/903,608, filed on Sep. 20, 2019.

(51) Int. Cl.
*H04L 9/32* (2006.01)
*H04L 9/30* (2006.01)
*H04L 1/00* (2006.01)
*H04L 67/1095* (2022.01)
*G06F 16/901* (2019.01)
*G06F 16/28* (2019.01)
*H04L 9/00* (2022.01)

(52) U.S. Cl.
CPC .......... *H04L 1/0061* (2013.01); *G06F 16/285* (2019.01); *G06F 16/9027* (2019.01); *H04L 9/3239* (2013.01); *H04L 9/3247* (2013.01); *H04L 9/50* (2022.05); *H04L 67/1095* (2013.01)

(58) Field of Classification Search
CPC ....... H04L 9/50; H04L 9/3255; H04L 9/3239; H04L 9/3247; H04L 1/0061; H04L 67/1095
See application file for complete search history.

(56) References Cited

U.S. PATENT DOCUMENTS

| 4,309,569 | A | 1/1982 | Merkle |
| 6,829,355 | B2 | 12/2004 | Lilly |
| 8,984,384 | B1 * | 3/2015 | Juels ................... G06F 21/6218 |
| | | | 714/800 |

(Continued)

OTHER PUBLICATIONS

Vranken et al., "Fault Detection and Diagnosis with Parity Trees for Space Compaction of Test Responses," DAC 2006, Jul. 24-28, 2006, San Francisco, California, USA. (Year: 2006).*

(Continued)

*Primary Examiner* — Alina A Boutah
(74) *Attorney, Agent, or Firm* — Van Pelt, Yi & James LLP

(57) ABSTRACT

Determining data availability is disclosed, including: performing a data availability challenge with respect to a claimer node to determine whether the claimer node stores at least some elements included in a base layer in a digital tree corresponding to a data entity; and publishing a first set of elements associated with the base layer of the digital tree and the data availability challenge. Furthermore, encoding auditing is disclosed, including: obtaining a first set of elements associated with a base layer of a digital tree corresponding to a data entity; and generating an encoding validity determination of the digital tree based at least in part on whether the first set of elements is usable to recover a second set of elements associated with the base layer of the digital tree.

10 Claims, 18 Drawing Sheets

(56) References Cited

U.S. PATENT DOCUMENTS

| | | | |
|---|---|---|---|
| 10,116,450 B1 | 10/2018 | Brown | |
| 2007/0034687 A1 | 2/2007 | Numao | |
| 2012/0110336 A1* | 5/2012 | Frey | G06F 21/565 |
| | | | 713/181 |
| 2013/0297891 A1* | 11/2013 | Yi | G06F 12/0284 |
| | | | 711/153 |
| 2017/0180076 A1* | 6/2017 | Fin | H04L 1/0061 |
| 2018/0075253 A1 | 3/2018 | Auh | |
| 2018/0181756 A1 | 6/2018 | Campagna | |
| 2019/0109707 A1* | 4/2019 | Ajoy | H04L 9/0637 |
| 2019/0339668 A1 | 11/2019 | Biernat | |
| 2020/0201964 A1* | 6/2020 | Nandakumar | H04L 9/3239 |
| 2020/0218706 A1* | 7/2020 | Fokoue-Nkoutche | |
| | | | G06F 16/2246 |
| 2020/0287722 A1* | 9/2020 | No | H04L 9/304 |
| 2020/0344042 A1 | 10/2020 | Hwang | |
| 2020/0382315 A1* | 12/2020 | Lakk | H04L 9/3247 |
| 2021/0279354 A1 | 9/2021 | Gandhi | |
| 2021/0304201 A1* | 9/2021 | Li | G06Q 20/12 |

OTHER PUBLICATIONS

Al-Bassam et al., Fraud and Data Availability Proofs: Maximising Light Client Security and Scaling Blockchains with Dishonest Majorities, May 25, 2019.

Bagaria et al., Deconstructing the Blockchain to Approach Physical Limits, Nov. 8, 2018.

Lin et al., Error Control Coding, 2004.

\* cited by examiner $$\begin{array}{c}\phantom{p}\\ \text{parity equation 1}\\ \text{parity equation 2}\\ \text{parity equation 3}\\ \text{parity equation 4}\end{array}\begin{array}{cccccccc}C1 & C2 & C3 & C4 & C5 & C6 & C7 & C8\\\left[\begin{array}{cccccccc}1 & 0 & 1 & 0 & 1 & 1 & 1 & 0\\ 0 & 1 & 1 & 0 & 0 & 1 & 0 & 0\\ 0 & 0 & 1 & 1 & 0 & 0 & 2 & 0\\ 1 & 0 & 0 & 1 & 1 & 0 & 0 & 1\end{array}\right]\end{array}$$

FIG. 3

DETERMINING DATA AVAILABILITY

CROSS REFERENCE TO OTHER APPLICATIONS

This application claims priority to U.S. Provisional Patent Application No. 62/903,608 entitled DETERMINING DATA AVAILABILITY filed Sep. 20, 2019 which is incorporated herein by reference for all purposes.

BACKGROUND OF THE INVENTION

Technological advances have revolutionized the way that data is collected, generated, and used. A direct consequence is that data could become too big and/or too complicated to consume. For example, an individual may be interested in the latest government budget, census report, or business transaction, but only finds that the data he or she is interested in is embedded inside an entity that is too big to download and/or too complicated to comprehend. In this case, the best rescue for this (incapacitated) individual is to make sure that the data entity has been fully published to its community. However, the individual would still need an efficient way to check whether the authentic data entity (and not a fraudulent version) has been published in its entirety to the community.

BRIEF DESCRIPTION OF THE DRAWINGS

Various embodiments of the invention are disclosed in the following detailed description and the accompanying drawings.

FIG. 3 is an example of a parity matrix that specifies P=4 parity equations for N=8 coded symbols.

DETAILED DESCRIPTION

Figure 1:
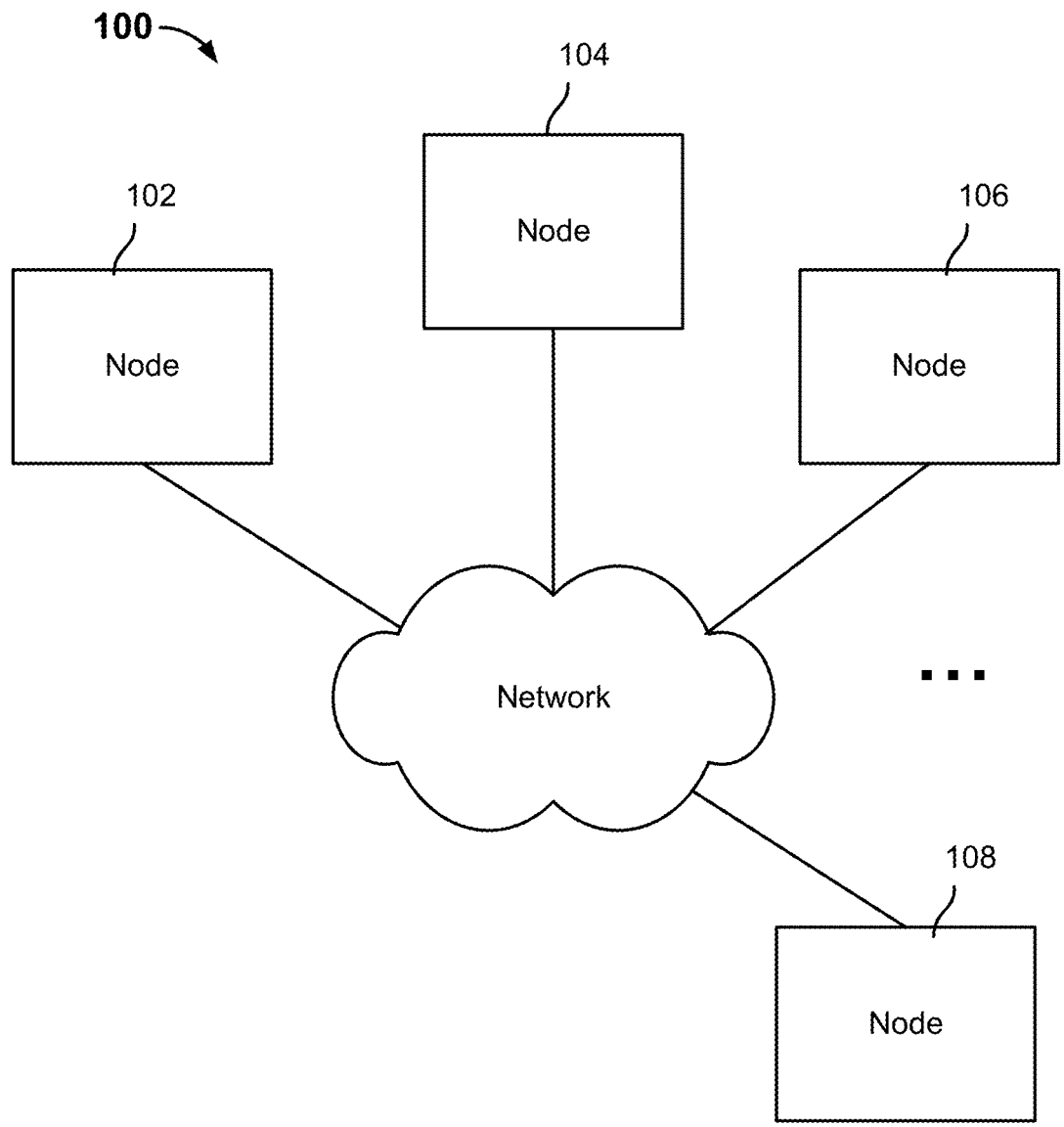
FIG. 1 is a diagram showing a multi-node network in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The problem of making sure whether a data entity has been fully published or not to a network of nodes can be abstracted and generalized into a data availability problem in a communication network. More specifically, the data availability problem is considered in a multi-node communication network, where nodes can directly and indirectly communicate with each other through message passing. Once a node has produced a data entity, the other nodes could in the network make sure that the producer node has fully published this data entity to the network, which will make the data fully available to the network. This way, the other nodes in the network will have the chance to fully download it and review it.

This data availability problem is trivial in a trusted network where every node is honest. Under the setting of a trusted network, if a first node is informed by a second node regarding a newly published data entity, and this second node has successfully downloaded the data entity, then the first node is assured that the data entity has been fully published and is available to the network.

However, this data availability problem becomes more involved in a trustless network where nodes are not necessarily honest. Under this setting, a node can no longer trust other nodes' claims of possessing the data entity. Instead, the node would have to verify these other nodes' claims. A naive approach is for this node to download the data entity itself from the claimer nodes, but downloading an entire data entity incurs high download cost, and the data entity may also be too complicated for this node to process. Therefore, it is desirable to enable a node to verify, with high confidence, that another node is in possession of a data entity without needing to download the entire data entity from the other node.

Embodiments of techniques to allow nodes in a multi-node communication network to verify whether a data entity has been fully published to the network are described herein. Various embodiments described herein solve the data availability problem in a trustless multi-node communication network. In some embodiments, special redundancy coding is applied to the data entity to generate parity information and the data entity along with such parity information form the base layer of a digital signature tree (sometimes referred as simply "digital tree") corresponding to the data entity. In some embodiments, nodes are enabled to verify the data availability of the data entity at other nodes through sampling a small portion of the encoded data entity (the digital tree) from the other nodes.

In various embodiments, nodes are enabled to audit the correctness of the encoding of a data entity. In various embodiments, a data availability challenge is performed by a first node (e.g., a verifier node) with respect to a second node (e.g., a claimer node) to determine whether the claimer node stores at least some elements included in a base layer in a digital tree corresponding to a data entity. In some embodiments, the data availability challenge comprises the verifier node sampling, from the claimer node, a portion of the elements from the base layer of the digital tree corresponding to the data entity and determining whether their respective digital signatures match obtained membership proofs. As will be described in further detail below, given that the base layer of the digital tree includes the partitions of the data entity as well as parity information that was generated by encoding the partitions of the data entity, it would be unlikely for the claimer node to successfully respond to the data availability challenge if the claimer node did not possess the data entity in its entirety. In various embodiments, a result of the data availability challenge is published to the network of nodes, where the result comprises a set of verified elements associated with the base layer of the digital tree. For example, the verified node can publish verified elements one-by-one as they are verified. The sampled elements of the base layer of the digital tree that could be verified by the verifier node are published to the network of nodes for other nodes (e.g., auditor nodes) to audit the encoding validity of the digital tree. The encoding validity of the digital tree is determined based at least in part on whether the set of verified elements is usable to recover a set of remaining elements associated with the base layer of the digital tree such that all the partitions (data elements) of the data entity are recovered. The encoding of the digital tree is valid in the event that all the data elements of the data entity in the base layer of the digital tree are obtained from other nodes and/or recovered at an auditor node.

In some embodiments, nodes are also enabled to prove the quality of the redundancy code. In some embodiments, a low-quality redundancy code that is used to encode a data entity is replaced with a new code by the nodes without executing any consensus protocol.

FIG. 1 is a diagram showing a multi-node network in accordance with some embodiments. In the example, network 100 includes at least nodes 102, 104, 106, and 108. Each of nodes 102, 104, 106, and 108 is a device that may be operated by one or more parties. Each of nodes 102, 104, 106, and 108 may be configured with the same or different computing resources. Each of nodes 102, 104, 106, and 108 may be configured from a physical and/or virtual computing resource. Network 100 is a trustless network, in that nodes in the network are not guaranteed to be trusted (i.e., providing only authentic data or claims). As such, any claim made by a node in network 100 needs to be verified by another node. Furthermore, a node that has verified a claim made by other node(s) may publish (e.g., via broadcasting messages) the verification results to network 100. Other nodes can then audit the verification results to determine whether the verified data meets one or more conditions that indicate that the data is fully available (i.e., available in its entirety) collectively across one or more nodes in network 100 and/or is valid (e.g., correctly generated according to a protocol that has been agreed upon by the nodes of network 100). This way, if there is any problem with a data entity that has allegedly been published in full to network 100, then vigilant and competent nodes in the community of nodes will be able to detect the problem and alert other nodes. Each of nodes 102, 104, 106, and 108 can perform any one or more roles with respect to producing a data entity, claiming possession of the data entity, verifying another node's claim of possession of the data entity, and auditing the data entity based on verification results. A node in network 100 may perform a different role with respect to a different data entity that has allegedly been published fully to network 100.

Figure 2:
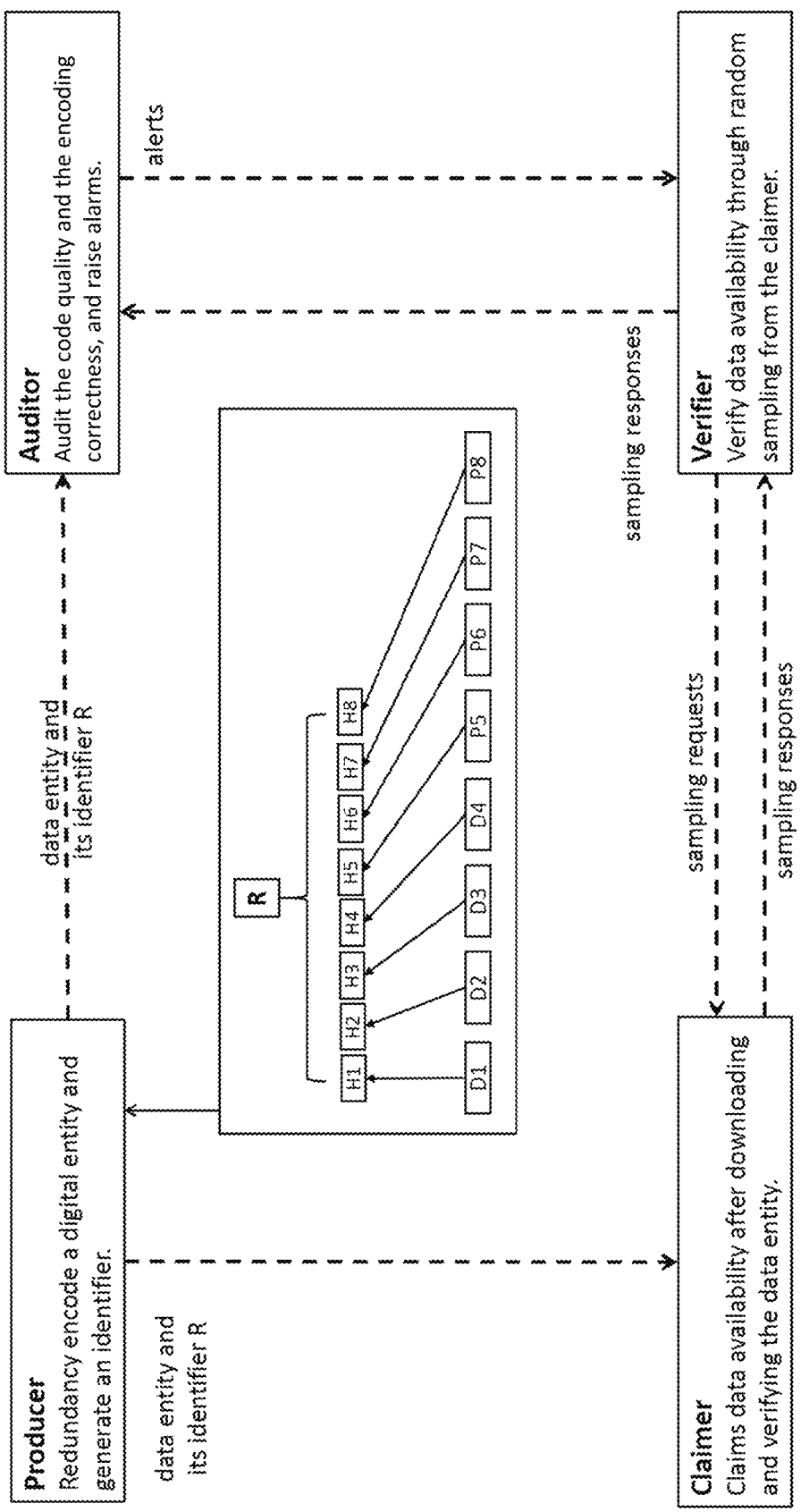
FIG. 2 shows four example roles that can be performed by nodes in a multi-node network.

FIG. 2 shows four example roles that can be performed by nodes in a multi-node network. The four example roles described in FIG. 2 may be performed by the nodes of network 100 of FIG. 1. In the example of FIG. 2, the four example roles that will be described further below include: producer, claimer, verifier, and auditor. As an overview, in a network in which nodes perform the four example roles of FIG. 2, a data entity is produced by a producer node and other nodes in the network are configured to efficiently verify whether the data entity has been fully published by the producer node to the network. Put another way, claimer node(s) download the data entity from the producer node while verifier and auditor nodes determine whether the data entity has been made fully available by the producer node to one or more claimer nodes or not. In one specific example, the data entity is a block of transactions that is to be added (e.g., by a producer node) to a blockchain.

The four example roles that can be performed by nodes in the data availability verification system are as follows:
1. Producer: a producer node produces a data entity, performs redundancy coding and generates digital signatures (e.g., that are organized in a digital tree) according to various embodiments described herein, and publishes (e.g., via broadcasting messages) the data entity and digital signatures to the network. As will be described further below, in some embodiments, the root of the digital tree that corresponds to the data entity is sometimes referred to as the digital signature corresponding to the data entity or the identifier R of the data entity.

2. Claimer: a claimer node downloads a copy of the data entity from the producer node and claims (e.g., via broadcasting messages) to the network that it fully possesses the data entity and is willing to prove it to the other nodes in the network. In some embodiments, a claimer node also reproduces the digital tree by encoding the elements of the obtained data entity and generating hashes (membership proofs) from the elements.
3. Verifier: a verifier node verifies the availability of the data entity through issuing challenges to the claimer node(s) (e.g., sampling portions of the coded data entity from the claimer node(s)). A verifier node will not confirm the availability of the data entity at the claimer node(s) unless the challenge(s) have been correctly responded to (e.g., all its sampling requests have been correctly responded to). A verifier node also re-publishes the data availability challenges' results (e.g., verified samples) to the network for auditing by other nodes.
4. Auditor: an auditor node audits the validity of the digital tree of the data entity, such as the quality of the redundancy code and the correctness of the encoding. The auditor node will publish an appropriate proof to the network if the data entity is invalid so that other nodes (especially the verifier nodes) can reject the data entity (e.g., after validating the proof). Incorrect encoding means at least one data element (a data element is a partition of the data entity) cannot be correctly decoded using the coded elements. If a malicious producer node conducts incorrect encoding, then it can 1) publish most but not all of the coded elements so that a verifier node will not be able to detect hiding through sampling; 2) auditor nodes cannot decode the data elements correctly and, thus, will not be able to determine whether the content of the data entity is fraudulent or not. In this case, the verifier node will assume that the data entity is available, and will never receive a fraud alert. It will thus wrongly accept the fraudulent data entity. Thus, the auditor node must check and prove incorrect encoding so that it can inform other nodes in the network of potential fraudulent activity on the part of the producer node.

In various embodiments, a data entity that is published by a producer node is divided into partitions (which are sometimes referred to as "data elements" or "data symbols" in a digital tree) and then encoded using a redundancy code to generate a set of parity information (which are sometimes referred to as "parity elements" or "parity symbols" in a digital tree). In various embodiments and as will be further described below, the base layer of the digital tree that corresponds to the data entity includes partitions (data elements) of the data entity and the corresponding parity information. In some embodiments, the redundancy code is systematic. In various embodiments, an (N, K) redundancy code is used to encode the partitions of the data entity. An (N, K) redundancy code is a function that generates N≥K coded elements using K data elements, where each of N–K parity elements is a combination of the K data elements. The ratio r=K/N is called the "coding rate." A redundancy code generally allows the K data elements to be correctly decoded if the number of erased or erroneous coded elements is reasonably small. In some embodiments, the code is described by a P×N parity matrix M. Every entry in M is chosen from a certain algebraic field, such as a binary field, or a larger Galois field. M×C yields a vector of P zeros, where C is a length-N vector containing all the N coded elements. More specifically, each row of M specifies a parity equation, such that after multiplying the N entries of this row with the corresponding coded elements, the N products must sum up to zero.

FIG. 3 is an example of a parity matrix that specifies P=4 parity equations for N=8 coded symbols. According to the first row, C1+C3+C5+C6=0 is the first parity equation. According to the second row, C2+C3+C6=0 is the second parity equation. According to the third row, C3+C4+2C7=0 is the third parity equation. According to the fourth row, C1+C4+C8=0 is the fourth parity equation.

Figure 4:
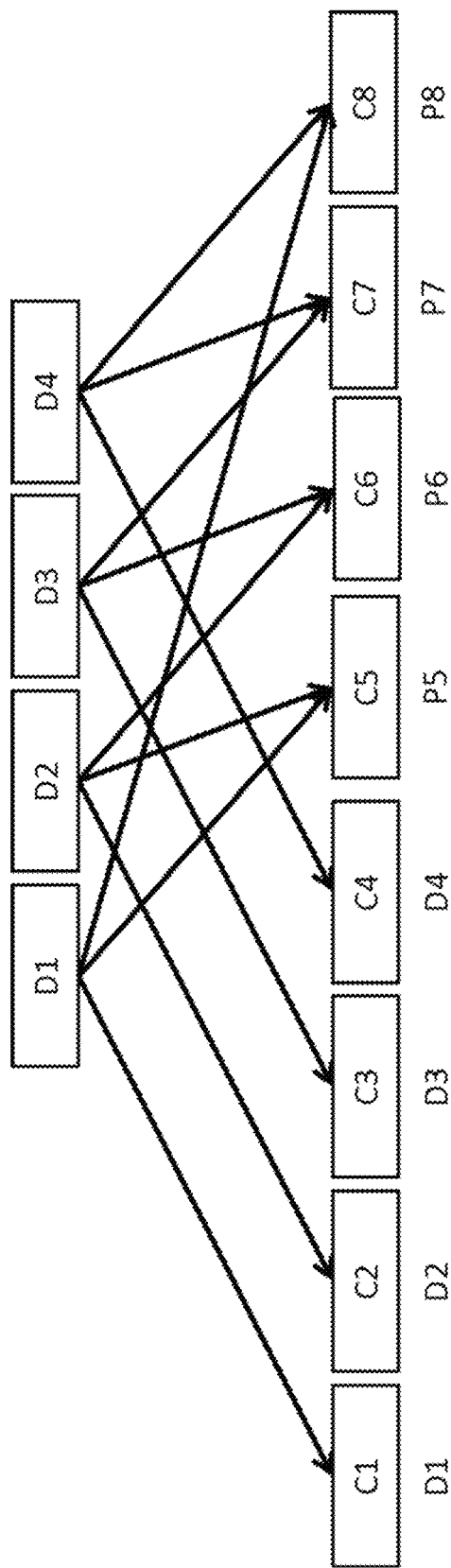
FIG. 4 is an example of the producer node applying redundancy encoding to a data entity according to parity matrix M in accordance with some embodiments.

FIG. 4 is an example of the producer node applying redundancy encoding to a data entity according to parity matrix M in accordance with some embodiments. After generating a data entity, the producer node first partitions the data entity into 4 data elements, D1, D2, D3, D4. The producer node then uses them to generate 8 coded elements that satisfy all the parity equations specified in M. For example, C2=D2, C3=D3, C6=—D2–D3, so that C2+C3+C6=0. In some embodiments, the encoding is systematic, such that the data elements also present as coded elements. In this case, the remaining N–K coded elements are called "parity elements." In FIG. 4, a systematic encoding is applied, so that C1=D1, C2=D2, C3=D3, C4=D4, and the remaining 4 coded elements C5=P5, C6=P6, C7=P7, and C8=P8 are parity elements.

Every redundancy code has a performance parameter called stopping ratio $\alpha$ under a given decoding algorithm. This ratio is the smallest fractional number such that any $(1-\alpha)N$ coded symbols allow the decoding of the K data symbols using this decoding algorithm. This means that if the producer node is dishonest and intends not to fully disclose a data entity, it will need to at least hide $\alpha$ percent of the coded symbols to prevent decoding. In some embodiments, a decoding algorithm and a target stopping ratio $\alpha^*$ are both pre-defined for the system, and are known by all the nodes.

Figure 5:
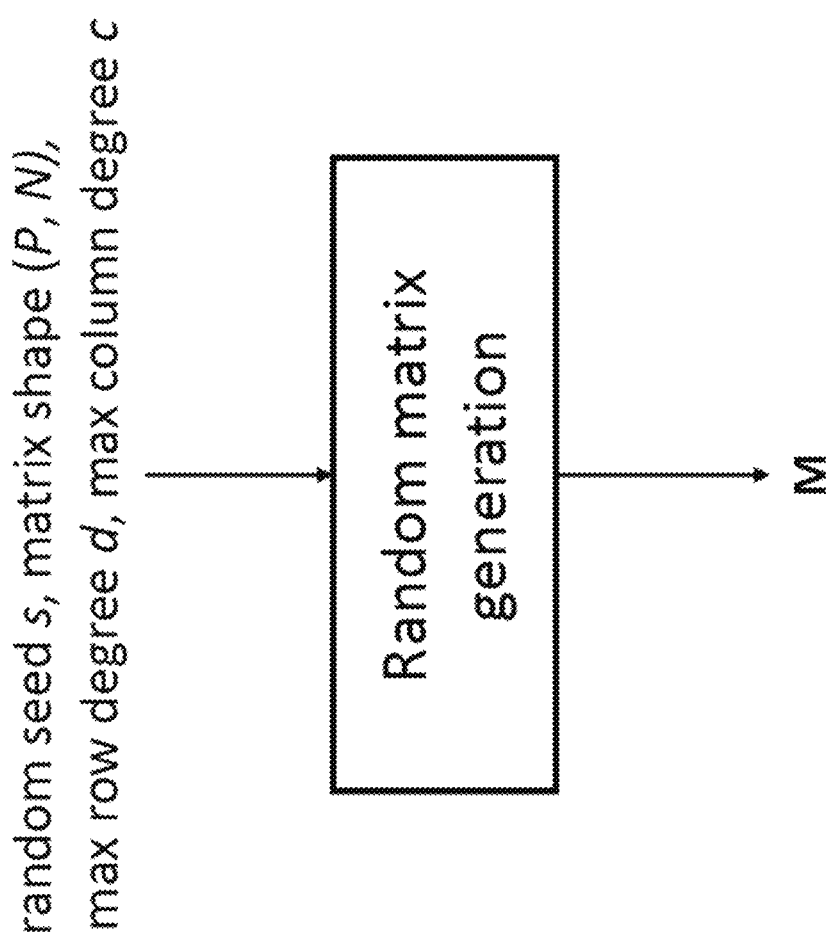
FIG. 5 demonstrates the generation of parity matrix M using a random matrix generation function in accordance with some embodiments.

FIG. 5 demonstrates the generation of parity matrix M using a random matrix generation function in accordance with some embodiments. In some embodiments, the random matrix generation function takes as input, among others, a random seed e, the matrix shape/dimensions P and N, the maximum row weight d (the maximum number of non-zero entries in a row) of M, and the maximum column weight c (the maximum number of non-zero entries in a column) of M. In some embodiments, the random matrix generation function may have some of the following properties:
- it will always output the same M given the same random seed;
- a randomly generated M has a stopping ratio of $\alpha \geq \alpha^*$ with a nonzero probability;
- it is hard to determine whether a randomly generated M has a stopping ratio of $\alpha \geq \alpha^*$ or not.

After the N coded elements have been generated, the producer node is required to generate an identifier R of the data entity using the N coded elements. This identifier R, among other usages, can be used to authenticate coded elements, namely, used to check whether a coded elements is a member of the N coded elements used to generate R or not.

To generate R, in various embodiments, the producer node is configured to first use a "one-way function" to generate one digital signature for every coded element. The resulted N digital signatures are then accumulated to generate R. A one-way function, denoted by H=h(x), generally satisfies that 1) H is easy to compute using x, 2) it is highly unlikely that H(x)=H(y) if x≠y, and 3) it is hard to correctly reproduce the value of x given H. In various embodiments, an H generated using such a function is called a "digital signature of x." An example class of one-way functions is the SHA (secure hash algorithm) class.

Figure 6:
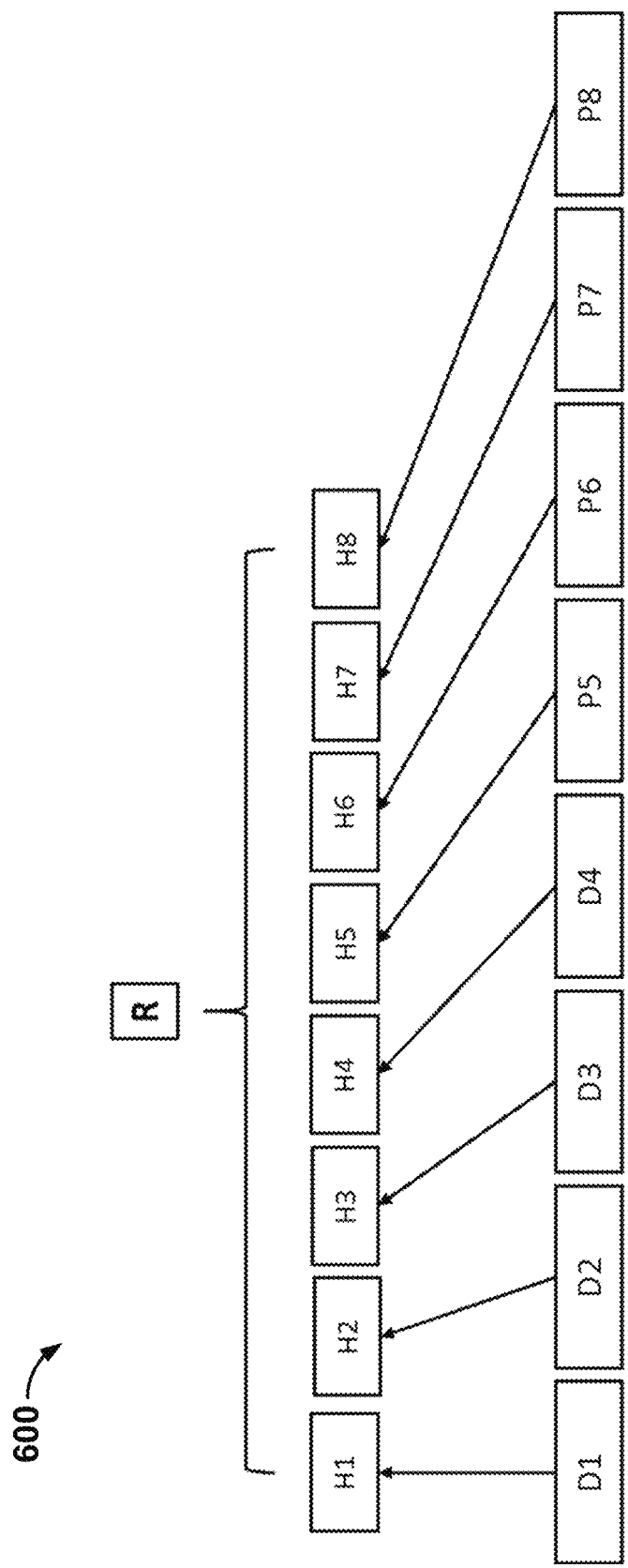
FIG. 6 shows a first example digital tree corresponding to a data entity in accordance with some embodiments.

FIG. 6 shows a first example digital tree corresponding to a data entity in accordance with some embodiments. As shown in FIG. 6, in some embodiments, the N digital signatures of the N coded elements are concatenated and fed to a one-way function to generate the identifier R of the data entity. In digital tree 600, the N coded elements (including data elements D1, D2, D3, and D4 and parity elements P5, P6, P7, and P8) form the base layer of the tree, the N digital signatures of the N coded elements form the layer above the base layer of the tree, and identifier R forms the root of the tree. In this embodiment, a "membership proof" of a coded element in the base layer of the digital tree is its corresponding digital signature in the set of N digital signatures of the N coded symbols in the layer above the base layer. For example, the membership proof (digital signature) of base layer data element D1 is element H1 in the layer above the base layer in the digital tree. In another example, the membership proof (digital signature) of base layer data element D2 is element H2 in the layer above the base layer in the digital tree. Any node who has the identifier R, a coded element, and membership proofs corresponding to the coded elements in the base layer can authenticate this coded element by first 1) checking whether the digital signature of this coded element is included in the membership proof, and then 2) checking whether the membership proofs can reproduce R.

Figure 7:
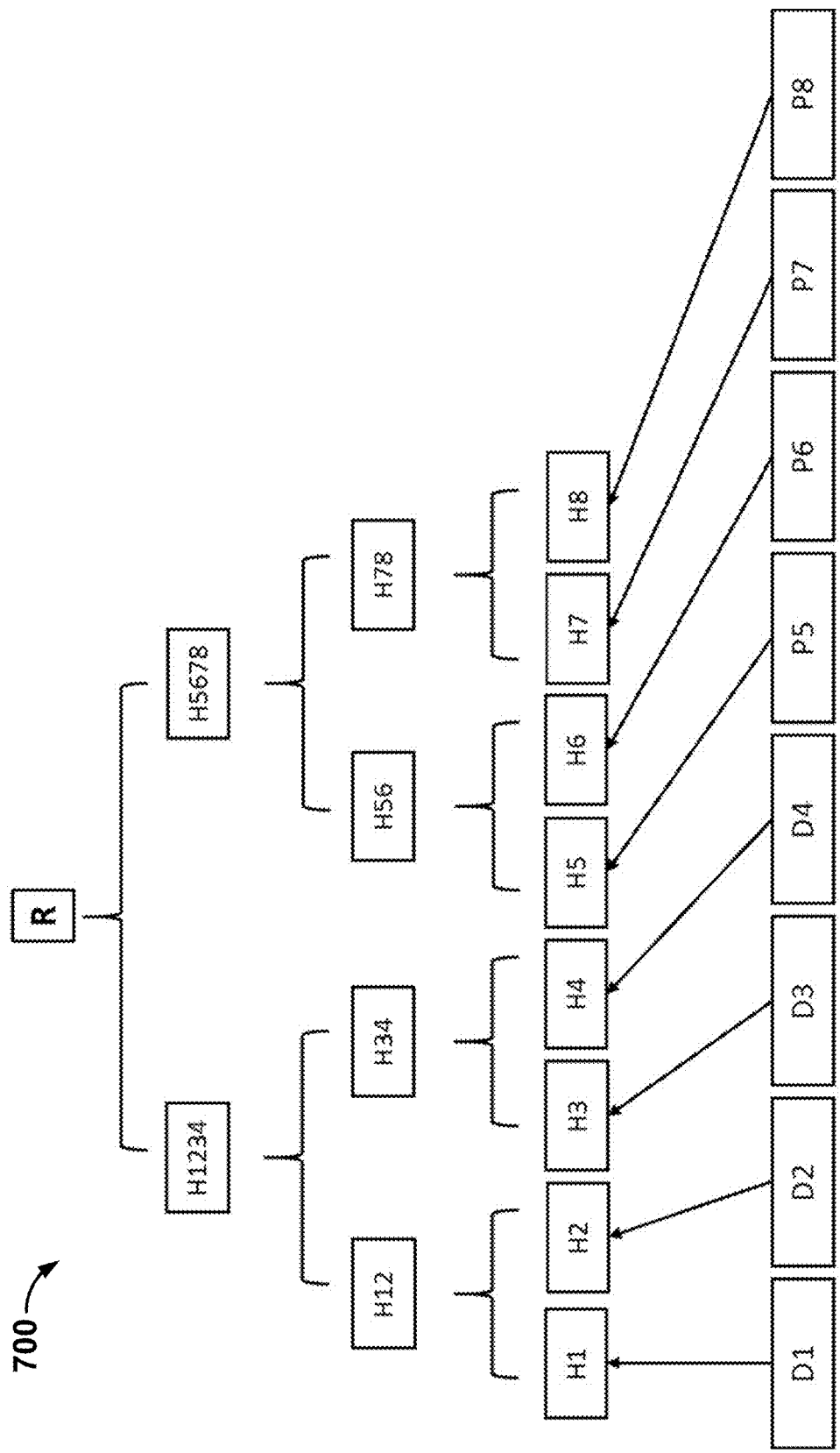
FIG. 7 shows a second example digital tree corresponding to a data entity in accordance with some embodiments.

FIG. 7 shows a second example digital tree corresponding to a data entity in accordance with some embodiments. As shown in FIG. 7, in some embodiments, an iterative digital signature accumulator is applied to the N digital signatures of the N coded symbols to generate the identifier R of the data entity. In this technique, after the N digital signatures of the N coded symbols are generated, every $p \geq 2$ digital signatures are concatenated and fed to a one-way function to generate a new digital signature, yielding a total N/p (rounded to integer) new digital signatures. Then in the next iteration, every $p \geq 2$ of these new digital signatures are concatenated and fed to a one-way function to generate a new digital signature. Such iterations continue until the number of digital signatures generated in one iteration is sufficiently small (such as 2), which are then concatenated to generate the identifier R of the data entity. The result is a tree-like layered data structure. The membership proof of a coded element is all the sibling digital signatures between this coded element and the identifier R. As such, in digital tree 700, the N coded elements (including data elements D1, D2, D3, and D4 and parity elements P5, P6, P7, and P8) form the base layer of the tree, the N digital signatures of the N coded elements form the layer above the base layer of the tree, the digital signatures are then iteratively concatenated and fed into a one-way function to form additional layers, and identifier R forms the root of the tree. For example, in FIG. 7, H1 and H2 are concatenated and fed to a one-way function to generate H12. Then, H12 and H34 are concatenated and fed to a one-way function to generate H1234. And finally, H1234 and H5678 are concatenated and fed to a one-way function to generate R. The membership proof of D1 consists of H1, H2, H12, H34, and H1234. Any node who has the identifier R, a coded element, and the element's corresponding membership proof, can authenticate this coded symbol by first checking whether the digital signature of this coded symbol is in the membership proof, and then checking whether the membership proof can reproduce R.

In some embodiments, an honest producer node is required to at least publish the data entity and its identifier R. This will allow any other node to authenticate the data entity through reproducing R using the data entity, and then inspect the content of the data entity for frauds.

However, a dishonest producer node may deceive the network to accept a data entity described by its identifier R without fully disclosing the content of this entity. For example, the data entity may contain invalid business transactions that are in favor of the dishonest producer node. Among other malicious behaviors, a dishonest producer node may publish the identifier R, whilst:

1. Only publishing a subset of all of the data elements that form the data entity; and/or
2. Only publishing a subset of all of the digital signatures (i.e., membership proofs) corresponding to the data and parity elements in the base layer of a digital tree; and/or
3. Finding a small set of coded elements that will prevent the decoding, and hiding this set while publishing the remaining coded elements with their membership proofs; and/or
4. Conducting the encoding incorrectly. For example, the producer node could generate coded elements that will fail parity equation(s) and/or do not match their digital signatures.

The first three malicious behaviors mean that the data entity is not fully available to the network and should not be accepted yet by any of the nodes in the network. The fourth and last malicious behavior (i.e., incorrect encoding) means that the data entity is fraudulent and should be rejected by all the nodes in the network.

Figure 8:
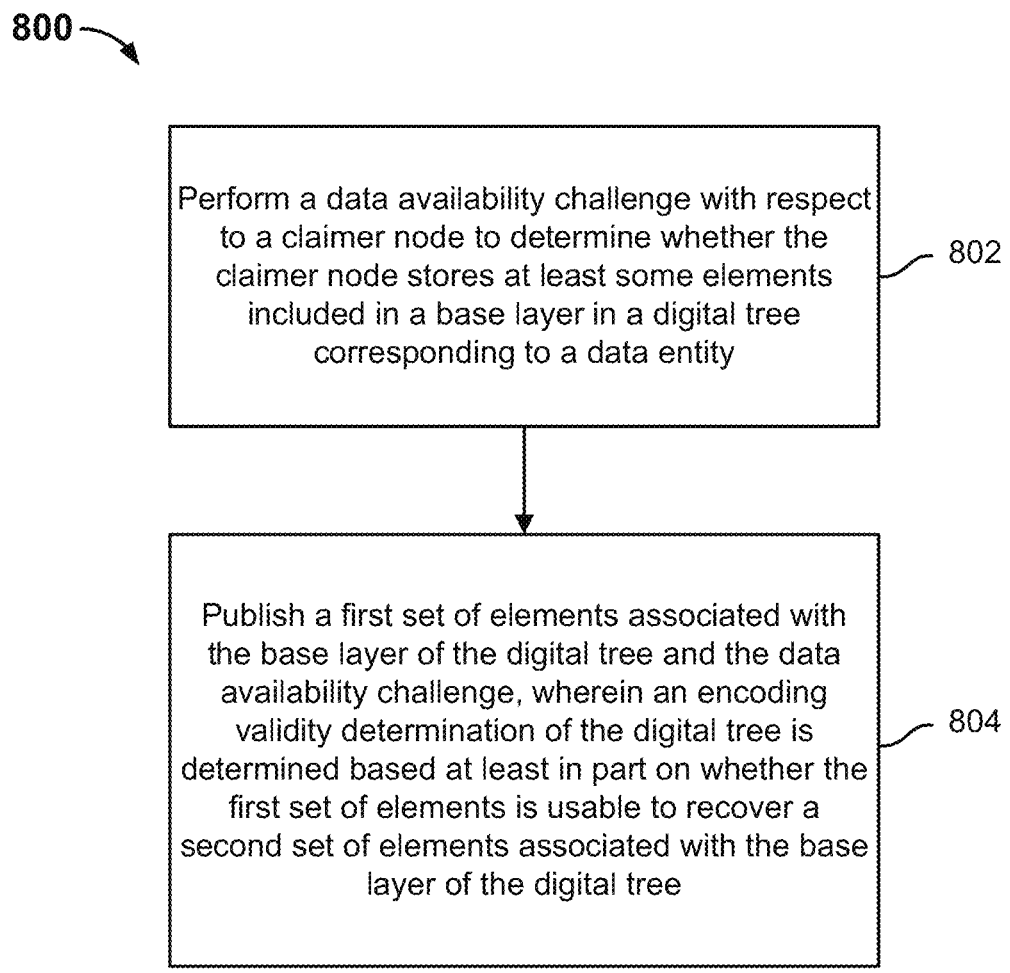
FIG. 8 is a flow diagram showing an embodiment of a process for verifying and auditing the data availability of a data entity in a network.

FIG. 8 is a flow diagram showing an embodiment of a process for verifying and auditing the data availability of a data entity in a network. In some embodiments, process 800 may be implemented by a node in network 100 of FIG. 1. Specifically, in some embodiments, process 800 may be implemented by a node that is performing a verifier role with respect to a data entity.

At 802, a data availability challenge with respect to a claimer node is performed to determine whether the claimer node stores at least some elements included in a base layer in a digital tree corresponding to the data entity. In some embodiments, the verifier node obtains the authentic digital signature (which is sometimes referred to as identifier R) corresponding to the data entity that has been published by the producer node. In some embodiments, the verifier node obtains the membership proofs (e.g., digital signatures) corresponding to the elements in the base layer of the digital tree corresponding to the data entity from a claimer node. The base layer of the digital tree includes data elements of the data entity as well as parity elements generated from the data elements using a redundancy code as explained in various embodiments described herein. In some embodiments, the verifier node verifies that the membership proofs of the base layer elements are fully available to the network by concatenating (at least portions of) them and feeding each concatenation into a one-way function, iteratively, if appropriate, to determine whether the resulting digital signature(s) can be used to reproduce identifier R that corresponds to the data entity. In some embodiments, one or more nodes in the network may claim to fully possess the data entity.

In some embodiments, the data availability challenge that is issued by the verifier node to a claimer node comprises a request for one or more elements in the base layer of the digital tree corresponding to the data entity. In some embodiments, the data and the parity elements of the base layer are sampled uniformly at random. Each requested/sampled element is then fed into a one-way function to generate a corresponding digital signature. The corresponding digital signature is then compared to the element's received membership proof. If the digital signature that is computed by the verifier node matches the elements' received membership proof, then that sampled element is determined to be verified. Given that the data elements of the base layer are encoded using a redundancy code and that the parity elements are dependent (e.g., are determined as a linear combination of the data elements), the verification of each additional sampled element in the base layer exponentially increases the verifier node's confidence level that the claimer node(s) (collectively) have the entire data entity (i.e., all the data elements of the base layer of the digital tree). In some embodiments, if the configured threshold for the verifying that the claimer node(s) (collectively) have the data entity in its entirety is a confidence level that is less than 100%, but is nevertheless a high confidence level, then the verifier node need only sample and verify only a (generally, small) portion of the elements in the base layer of the digital tree to reach the determination that the data entity is fully available with the claimer node(s) of the network.

At 804, a first set of elements associated with the base layer of the digital tree and the data availability challenge is published, wherein an encoding validity determination is determined based at least in part on whether the first set of elements is usable to recover a second set of elements associated with the base layer of the digital tree. Even before a verifier node reaches the determination that the data entity is fully available with the claimer node(s) of the network, it can re-publish the correctly downloaded and verified data and/or parity elements (along with their membership proofs) of the base layer of the digital tree. For example, the verified node can publish verified elements one-by-one as they are verified. As will be described with further detail below, auditor node(s) may obtain the re-published verified elements of the base layer of the digital tree to determine whether the encoding of the data entity is valid. In some embodiments, the encoding of the data entity is valid if the re-published verified elements can be used to decode and verify the remaining data, (not yet) re-published data elements of the base layer of the digital tree. In some embodiments, the encoding of the data entity is not valid and also indicative of incorrect coding if a decoded remaining (not yet) re-published data element cannot be verified against its membership proof or if the re-published/decoded elements do not satisfy the parity equations prescribed in the current parity matrix M. Incorrect coding may indicate that the producer node is engaged in fraudulent activity. In some embodiments, the encoding of the data entity is not valid and also indicative of bad code (the quality of the current parity matrix that is used to perform the encoding is inadequate) if after a threshold number of re-published verified/decoded elements is obtained by the auditor node, the remaining (not yet) re-published data elements cannot be decoded. Bad code may indicate that a new parity matrix M may need to be selected.

Figure 9:
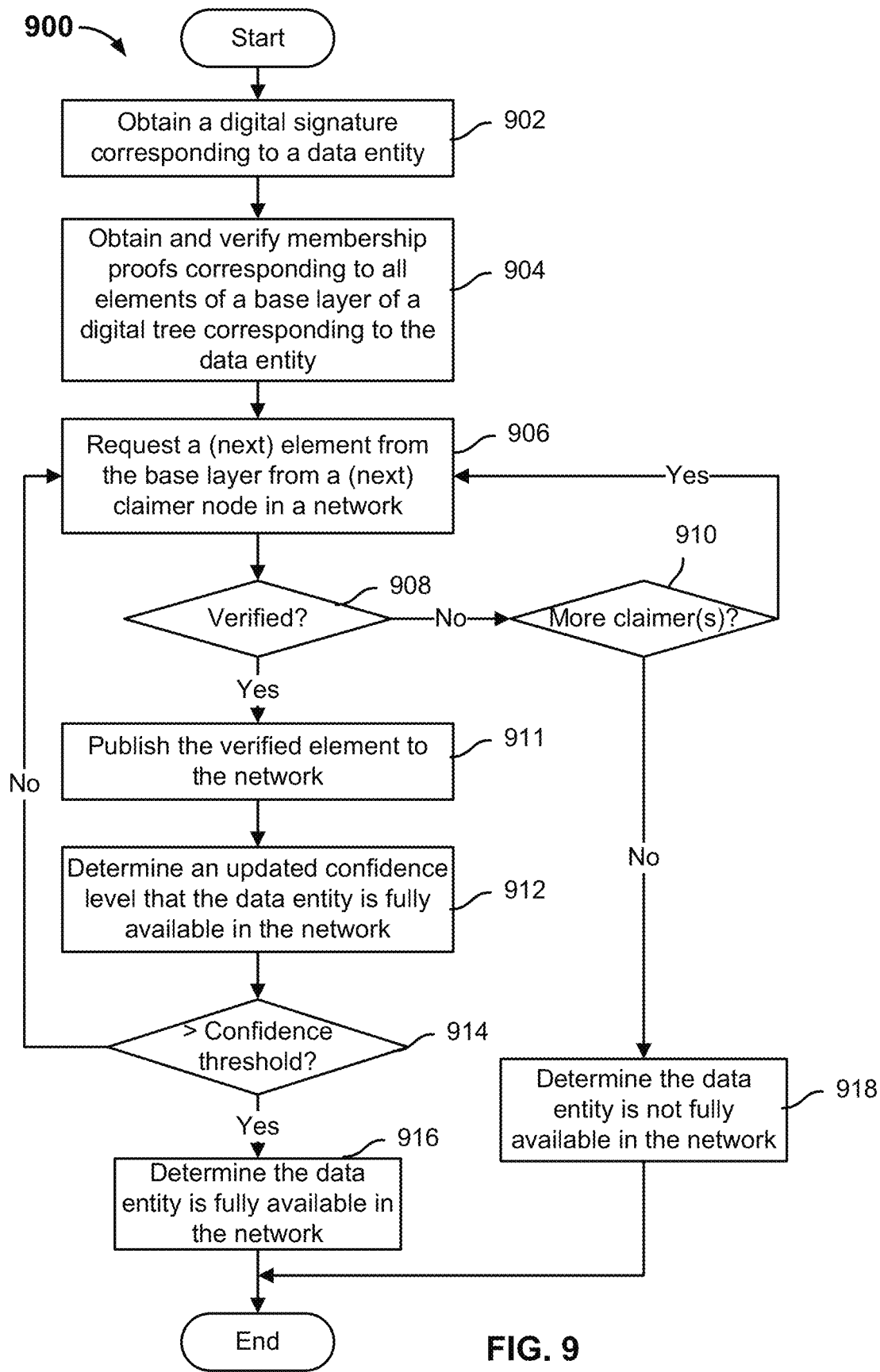
FIG. 9 is a flow diagram showing an example of a process for verifying the data availability of a data entity in a network.

FIG. 9 is a flow diagram showing an example of a process for verifying the data availability of a data entity in a network. In some embodiments, process 900 may be implemented by a node in network 100 of FIG. 1. Specifically, in some embodiments, process 900 may be implemented by a node that is performing a verifier role with respect to a data entity. In some embodiments, process 800 of FIG. 8 may be performed, at least in part, by process 900.

Process 900 is an example process showing that portions of base layer elements of the digital tree of a data entity can be sampled across one or more nodes in a network that claim to possess the data entity to determine (e.g., at a high confidence level) whether the data entity is fully available to the network.

At 902, a digital signature corresponding to a data entity is obtained. In some embodiments, the authentic digital signature (identifier R) of the data entity is obtained from the node that is the producer of the data entity.

At 904, membership proofs corresponding to all elements of a base layer of a digital tree corresponding to the data entity are obtained and verified. In some embodiments, if there are N elements in the base layer of the digital tree of the data entity, then the N membership proofs (digital signatures) of the N elements are obtained from at least one of the claimer node(s) and are verified against identifier R through reproducing R using these N digital signatures. The N digital signatures of the N elements are the digital signatures in the layer of the digital tree that is immediately above the base/bottom layer. It is not necessary to further download higher layer digital signatures because they can be reproduced with the N elements from the second to the base layer.

At 906, a (next) element from the base layer of the digital tree is requested from a (next) claimer node in a network of nodes. In some embodiments, elements are randomly sampled from the base layer of the digital tree of the data entity. Either a data element or a parity element can be sampled each time (per each request).

At 908, whether the element can be verified is determined. In the event that the element can be verified, control is transferred to 911. Otherwise, in the event that the element cannot be verified, control is transferred to 910. In some embodiments, to verify (authenticate) the sampled element, a digital signature is generated from the element (e.g., by inputting the element into a one-way function). The sampled element can be verified if the generated digital signature matches the element's corresponding membership proof that had been obtained at step 904. The sampled element cannot be verified if the generated digital signature does not match the element's corresponding membership proof that had been obtained at step 904, at which the element (that is determined based on its index in the base layer) is requested from another claimer node, if such a node exists.

At 911, the verified element is published to the network. The verified element can also be referred to be "re-published" by the verifier node to the network because it was initially published to the network by the producer node. In some embodiments, in addition to the verified element, the corresponding verified membership proof of the element can also be published.

At 910, it is determined if there is at least one more claimer node from which the element can be requested. In the event that there are no more claimer nodes from which the element can be requested, control is transferred to 918. Otherwise, in the event that there is at least one more claimer node from which the element can be requested, control is returned to 906 to request another such claimer node for the element. Because more than one node in the network can claim to possess the data entity and the data entity can be determined to be fully available even if all of its data elements are collectively possessed by more than one node, if one claimer node does not have a requested element or fails to provide a verifiable element, another claimer node can be queried for the element. In some embodiments, the producer node of the data entity is not sampled out of concern that a malicious producer node may frustrate the data availability verification effort of the verifier node.

At 918, the data entity is determined to not be fully available in the network. In the event that none of the claimer nodes in the network have a verifiable version of a requested element, it can be determined that the data entity is not fully available in the network.

At 912, an updated confidence level that the data entity is fully available in the network is determined. As mentioned above, due to the redundancy encoding used to generate the elements in the base layer of the digital tree, each additional element that is sampled from the base layer that is verified exponentially increases the verifier node's confidence level that the claimer node(s) have the data entity in its entirety. For example, the confidence level that the claimer node(s) have the data entity in its entirety can be determined using the following formula:

$$1-(1-\alpha^*)^s \quad (1)$$

Where s is the number of base elements that were sampled uniformly at random and where target stopping ratio $\alpha^*$ is the minimum portion of the coded symbols needed to be hidden to prevent decoding, and $\alpha^*$ is upper bounded by $1-r$ (where r is the coding rate of the redundancy code).

At 914, it is determined if the updated confidence level is greater than a verification confidence level threshold. In the event that the updated confidence level is greater than a verification confidence level threshold, control is transferred to 916. Otherwise, in the event that the updated confidence level is equal to or less than the verification confidence level threshold, control is returned to 906 so that a next element can be requested from the same claimer node or another claimer node. In some embodiments, the verifier node sets its own verification threshold confidence level F where $0 \leq F \leq 1$, and decides the number s of base layer elements to sample accordingly. In general, the higher the verification threshold confidence level, the larger the number of samples that needs to be made of the claimer nodes. For example, if $r=k/n=4/8=0.5$ and where $\alpha^*=0.3$, after 5 samples have been verified, the confidence level that the data entity is fully available in the network is $1-(1-0.3)^5=83.2\%$. If the verification threshold confidence level were 80%, then the threshold would have been met after 5 verified samples.

At 916, the data entity is determined to be fully available in the network. Because the verification confidence level threshold has been met based on the verified elements that were sampled, the data entity is determined to be fully available in the network.

Figure 10:
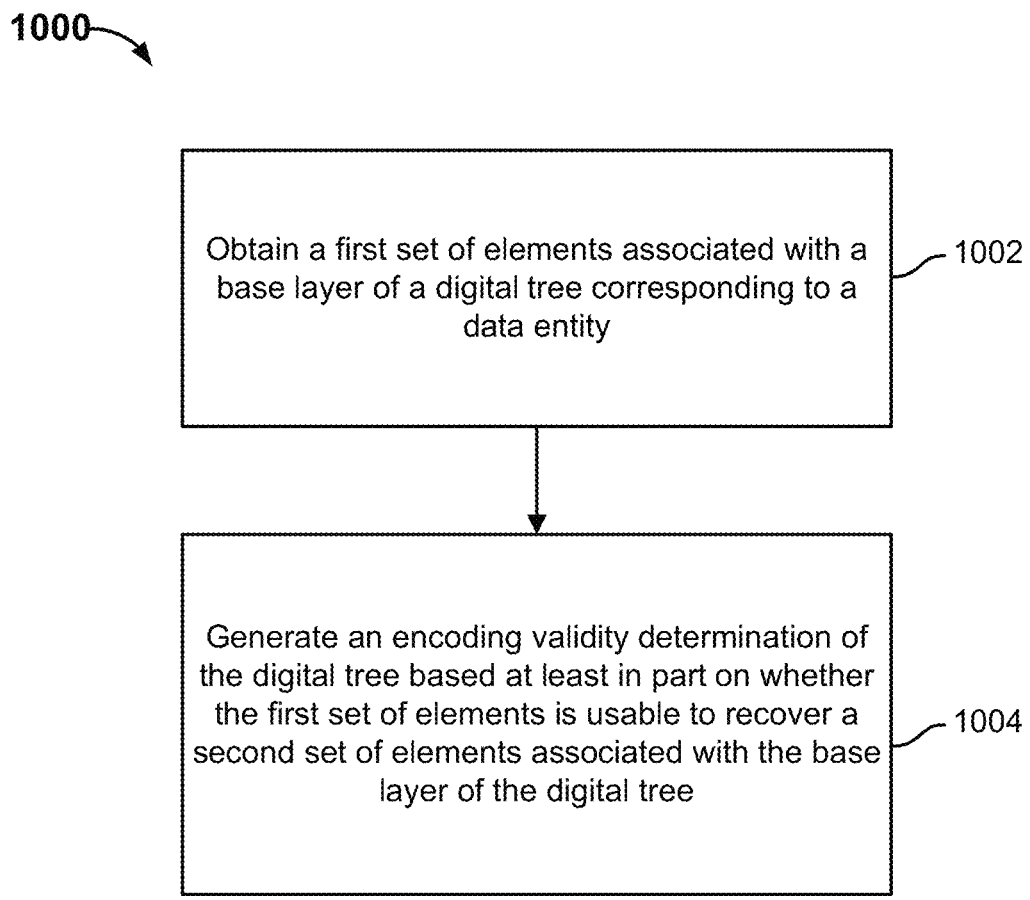
FIG. 10 is a flow diagram showing an embodiment of a process for auditing the data availability of a data entity in a network.

FIG. 10 is a flow diagram showing an embodiment of a process for auditing the data availability of a data entity in a network. In some embodiments, process 1000 may be implemented by a node in network 100 of FIG. 1. Specifically, in some embodiments, process 1000 may be implemented by a node that is performing an auditor role with respect to a data entity.

At 1002, a first set of elements associated with a base layer of a digital tree corresponding to a data entity is obtained. In some embodiments, the auditor node obtains the authentic digital signature (which is sometimes referred to as identifier R) corresponding to the data entity that has been published by the producer node. In some embodiments, the auditor node obtains the membership proofs (e.g., digital signatures) corresponding to the elements in the base layer of the digital tree corresponding to the data entity from other nodes (e.g., verified nodes that had published the verified membership proofs).

As mentioned above, the base layer of the digital tree includes data elements of the data entity as well as parity elements generated from the data elements using a redundancy code as explained in various embodiments described herein. In some embodiments, the auditor node is configured to collect verified base layer elements corresponding to the data entity that have been re-published by one or more verifier nodes. In some embodiments, the auditor node is configured to download base layer elements from claimer node(s).

At 1004, an encoding validity determination is generated based at least in part on whether the first set of elements is usable to recover a second set of elements associated with the base layer of the digital tree. The auditor node is configured to use the obtained elements of the base layer of the digital tree to determine whether the encoding of the data entity is valid. In some embodiments, the encoding of the data entity is valid if the collected elements can be used to decode and verify the remaining data, (not yet) obtained data elements of the base layer of the digital tree. In some embodiments, the encoding of the data entity is not valid and also indicative of incorrect coding if a decoded remaining (not yet) obtained data element cannot be verified against its membership proof or if the obtained elements do not satisfy the parity equations prescribed in the current parity matrix M. As mentioned above, incorrect coding may indicate that the producer node is engaged in fraudulent activity. In some embodiments, the encoding of the data entity is not valid and also indicative of a bad code if after a threshold number of re-published verified/decoded elements is obtained by the auditor node, the remaining (not yet) re-published data elements cannot be decoded. As mentioned above, bad code may indicate that a new parity matrix M may need to be selected.

Figure 11:
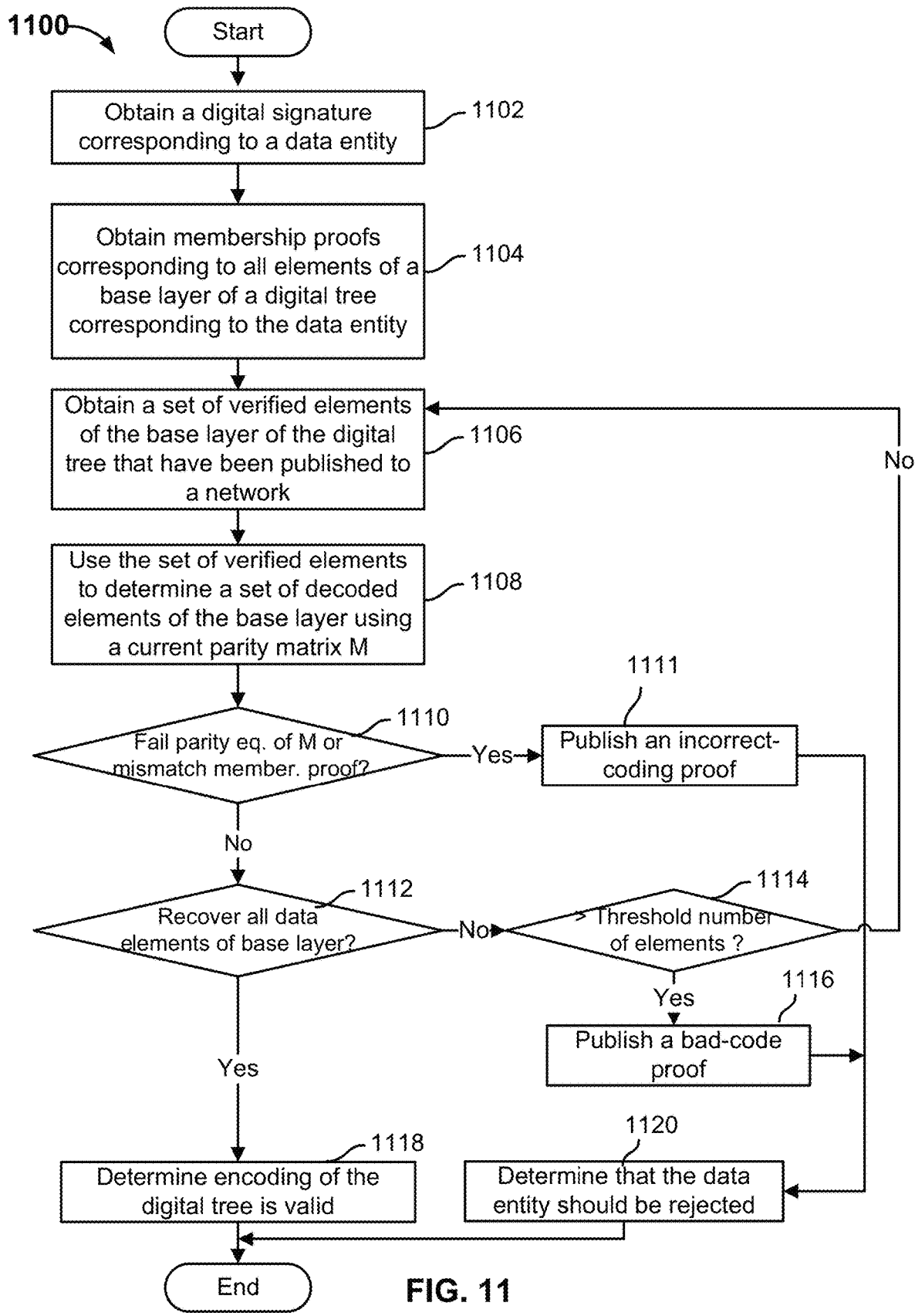
FIG. 11 is a flow diagram showing an example of a process for auditing the data availability of a data entity in a network.

FIG. 11 is a flow diagram showing an example of a process for auditing the data availability of a data entity in a network. In some embodiments, process 1100 may be implemented by a node in network 100 of FIG. 1. Specifically, in some embodiments, process 1100 may be implemented by a node that is performing an auditor role with respect to a data entity. In some embodiments, process 1000 of FIG. 10 may be performed, at least in part, by process 1100.

At 1102, a digital signature corresponding to a data entity is obtained. In some embodiments, the authentic digital signature (identifier R) of the data entity is obtained from the node that is the producer of the data entity.

At 1104, membership proofs corresponding to all elements of a base layer of a digital tree corresponding to the data entity are obtained. In some embodiments, if there are N elements in the base layer of the digital tree of the data entity, then the N membership proofs (digital signatures) of the N elements are obtained from at least one of the other node(s). In some embodiments, N membership proofs are verified against the identifier R through reproducing R using these N digital signatures. The N digital signatures of the N elements are the digital signatures in the layer immediately above the base/bottom layer. It is not necessary to further download higher layer digital signatures because they can be reproduced with the N elements from the second to the base layer;

At 1106, a set of verified elements of the base layer of the digital tree that have been published to a network is obtained. Verified elements of the base layer of the digital tree corresponding to the data entity that have been re-published by one or more verifier nodes are collected.

At 1108, the set of verified elements is used to determine a set of decoded elements of the base layer using a current parity matrix M. As will be described in further detail below, the parity equations that are included in the current parity matrix M (e.g., FIG. 3 shows an example parity matrix) describe the relationship between various data and parity elements in the base layer of a digital tree that was generated from a data entity using that matrix. As such, if only one element remains unknown (e.g., that element has not yet been downloaded or verified by a node in the network) in a parity equation (such parity equations are sometimes referred to as "degree-1" parity equations), then that element can be decoded using the degree-1 parity equation and the other known, verified elements that have been collected at the auditor node. One or more unknown elements can be decoded using the degree-1 parity equations of parity matrix M.

At 1110, whether a parity equation of the current parity matrix M is failed by any of the verified elements or the decoded elements, or whether a digital signature of any of the decoded elements mismatches a corresponding membership proof is determined. In the event that a parity equation of the current parity matrix M is failed by any of the verified elements or the decoded elements, or a digital signature of any of the decoded elements mismatches a corresponding membership proof, control is transferred to 1111. Otherwise, in the event that none of parity equations of the current parity matrix M are failed by any of the verified elements or the decoded elements and that no digital signature of any decoded elements mismatches a corresponding membership proof, control is transferred to 1112.

In some embodiments, there are two techniques for checking whether incorrect coding has occurred and that therefore, the encoding of the digital tree is invalid:

In a first case, if all the elements that are included in a parity equation have been verified and collected, then they are checked for whether their relationship satisfies the parity equation. If the parity equation is not satisfied, then incorrect coding has occurred.

In a second case, if fewer than all the elements that are included in one or more parity equations have been verified and collected but that the remaining, unknown element(s) can be decoded using the verified elements and the parity equation(s), then the remaining unknown element(s) are decoded. The digital signatures corresponding to the decoded elements are then computed. If the computed digital signatures of the decoded elements do not match their respective membership proofs that were obtained at step 1104, then incorrect coding has occurred.

At 1111, an incorrect-coding proof is published. In some embodiments, the incorrect-coding proof includes the failed parity equations, the elements that failed the parity equations, the elements whose digital signatures did not match their membership proofs, and/or the membership proofs of the elements that failed the parity equations or whose digital signatures did not match their membership proofs. Incorrect coding indicates that the producer node may have engaged in fraudulent activity by purposely encoding the data entity incorrectly.

At 1112, whether all data elements of the base layer have been recovered is determined. In the event that all data elements of the base layer have been recovered, control is transferred to 1118. Otherwise, in the event that fewer than all data elements of the base layer have been recovered, control is transferred to 1114. Where an (N, K) redundancy code is used to encode the data entity, there will be K data elements (and (N-K) parity elements) in the base layer of the digital tree. It is determined whether K data elements have been collected as verified elements and/or as decoded elements. The K data elements are the original partitions of the data entity.

At 1114, whether at least a threshold number of elements have been obtained is determined. In the event that at least a threshold number of elements have been obtained, control is transferred to 1116. Otherwise, in the event that fewer than the threshold number of elements have been obtained, control is returned to 1106 for the auditor node to collect any new elements that might have been re-published by verifier node(s) (e.g., since the last time that the auditor node had checked). In some embodiments, the threshold number of elements is defined as $(1-\alpha^*)N$ elements, where $\alpha^*$ is the target stopping ratio and N is the total number of elements in the base layer of the digital tree of the data entity. Because K data elements should have been decoded once $(1-\alpha^*)N$ elements have been obtained, it is determined that the stopping ratio $\alpha$ is smaller than the target stopping ratio $\alpha^*$ and that therefore, the quality current parity matrix M is inadequate.

Figure 17:
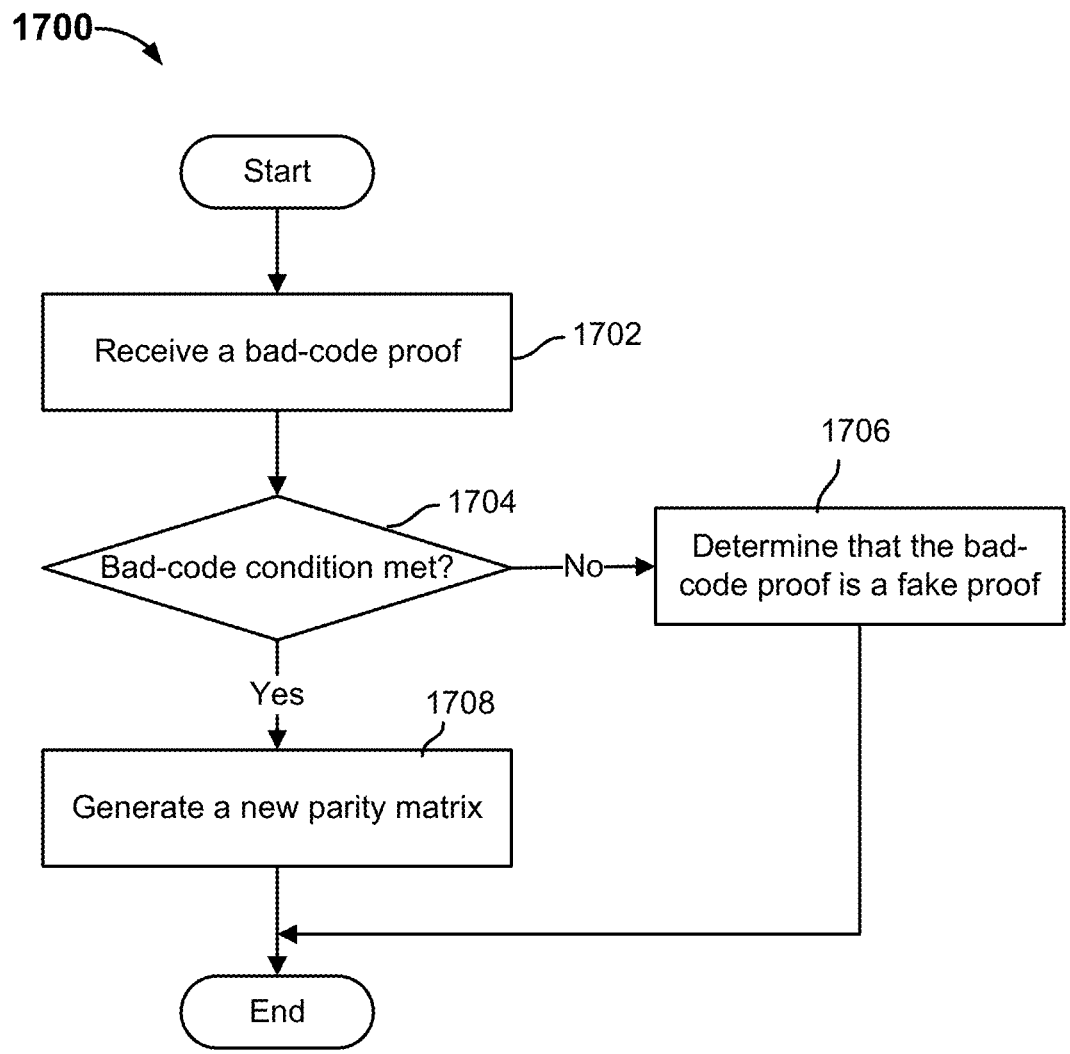
FIG. 17 is a flow diagram showing an example of a process for determining whether to select a new parity matrix.

At 1116, a bad-code proof is published. In some embodiments, a bad-code proof includes the indices of the base layer elements that have not yet been received. Put another way, the bad-code proof will include the indices of all the up to $\alpha^*N$ elements that it has not received. As will be described in further detail below, the determination of bad code may result in a new parity matrix being selected (e.g., using a consensus protocol). FIG. 17 describes an example process of determining whether a new parity matrix is to be selected for the network.

Returning to FIG. 11, at 1118, encoding of the digital tree is determined to be valid.

At 1120, it is determined that the data entity should be rejected. Because the encoding of the digital tree is determined to be invalid due to the presence of incorrect coding or bad code, the auditor node may indicate to the rest of the network that the data entity should be rejected. In some embodiments, the auditor node's publication of an incorrect-coding proof or a bad-code proof will in itself cause the other nodes to permanently reject the data entity without a separate alert from the auditor node to do so.

Figure 12:
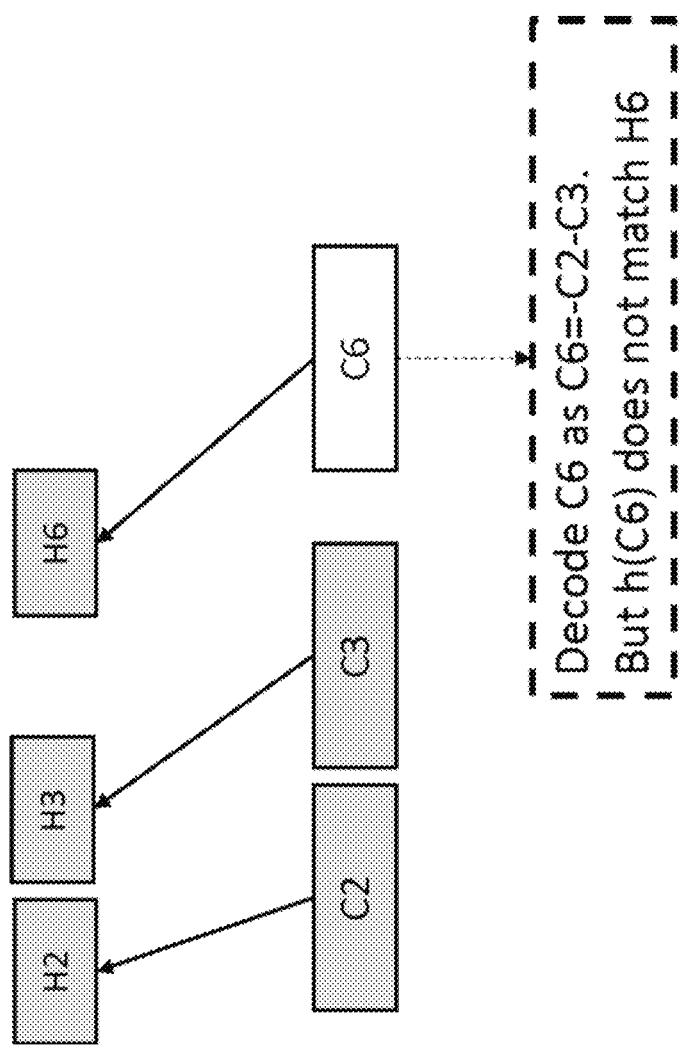
FIG. 12 is an example of a failed parity equation and its incorrect-coding proof.

FIG. 12 is an example of a failed parity equation and its incorrect-coding proof. Consider a parity equation C2+C3+C6=0. Assume that the values of C2 and C3 are known and have been verified/authenticated against their membership proofs. An auditor node could then decode C6 as C6=−C2−C3. If C6 does not match its digital signature H6, then this parity equation is failed. To prove this failed parity equation, an auditor node only needs to provide the two known coded symbols C2 and C3, and the membership proofs of all the three coded symbols involved in this parity equation.

Figure 13:
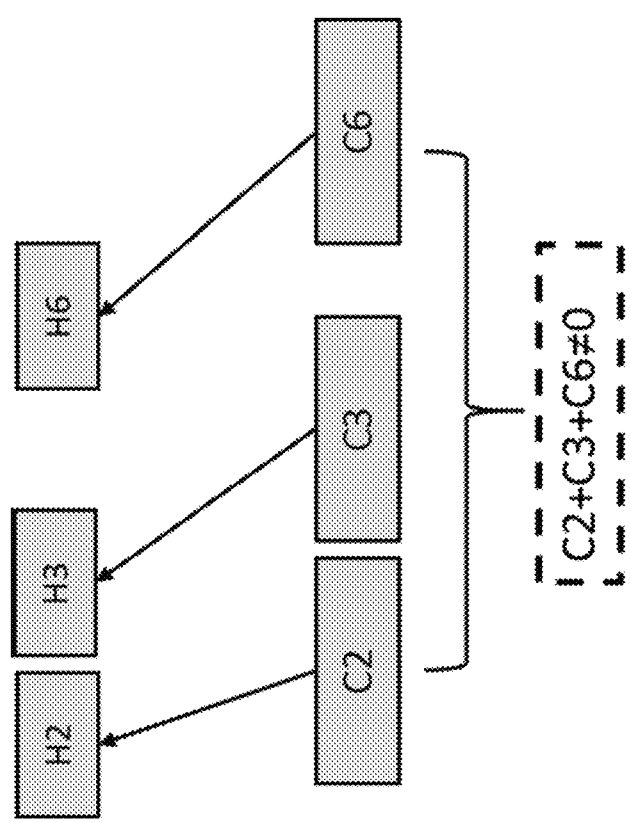
FIG. 13 is another example of a failed parity equation and its incorrect-coding proof.

FIG. 13 is another example of a failed parity equation and its incorrect-coding proof. Consider a parity equation C2+C3+C6=0. Assume that the values of C2, C3, and C6 are all known and have been verified/authenticated against their membership proofs. If C2+C3+C6 #0, then this parity equation is failed. To prove this failed parity equation, an auditor node only needs to provide the three known coded symbols C2, C3, and C6, as well as their membership proofs.

Figure 14:
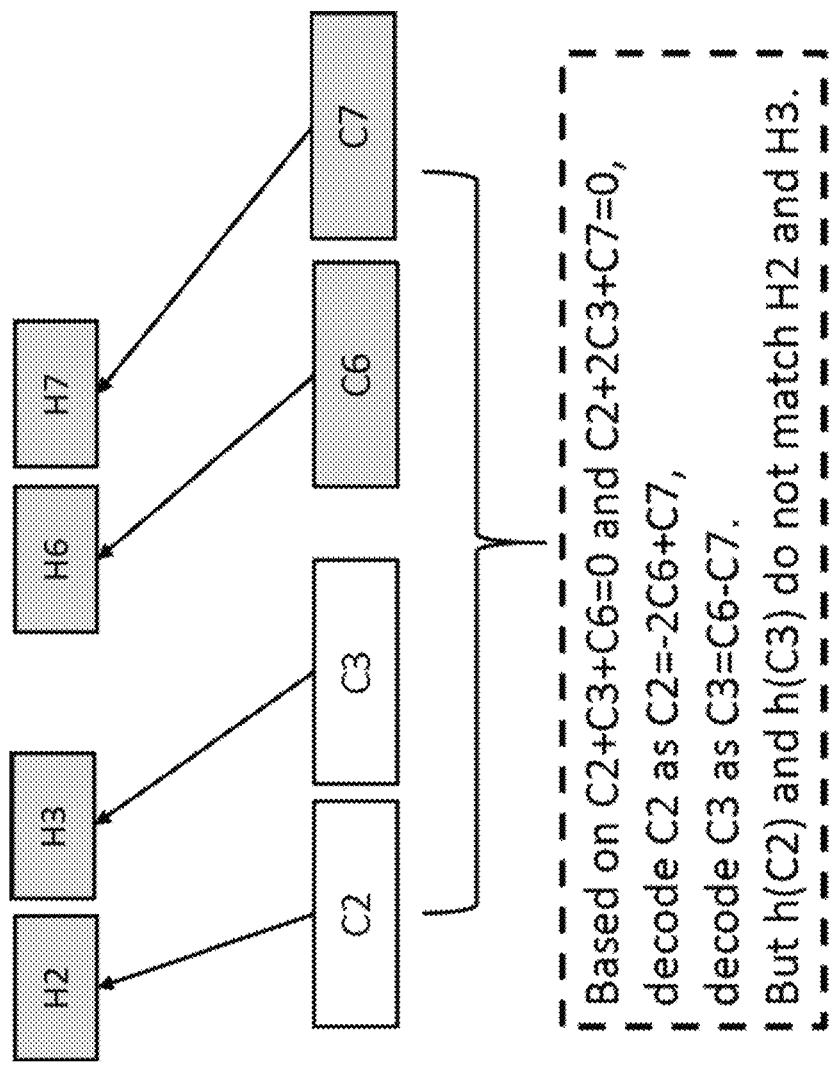
FIG. 14 is another example of a set of two failed parity equations and its incorrect-coding proof.

FIG. 14 is another example of a set of two failed parity equations and its incorrect-coding proof. Consider two parity equations C2+C3+C6=0 and C2+2C3+C7=0. Assume the values of C6 and C7 are known and have been authenticated against their membership proofs, then one can decode C2 as C2=−2C6+C7 and decode C3 as C3=C6−C7. If C2 and/or C3 does not match their membership proofs, then these two parity equations jointly fail. To prove this set of failed parity equations, the auditor node only needs to provide the two known coded symbols C6 and C7, as well as the membership proofs of C2, C3, C6, and C7.

In general, extending the examples above, an incorrect-coding proof may comprise of an arbitrary number of parity equations that jointly reveal element(s) that either fail parity equation(s) or do not match with their membership proofs.

Figure 15:
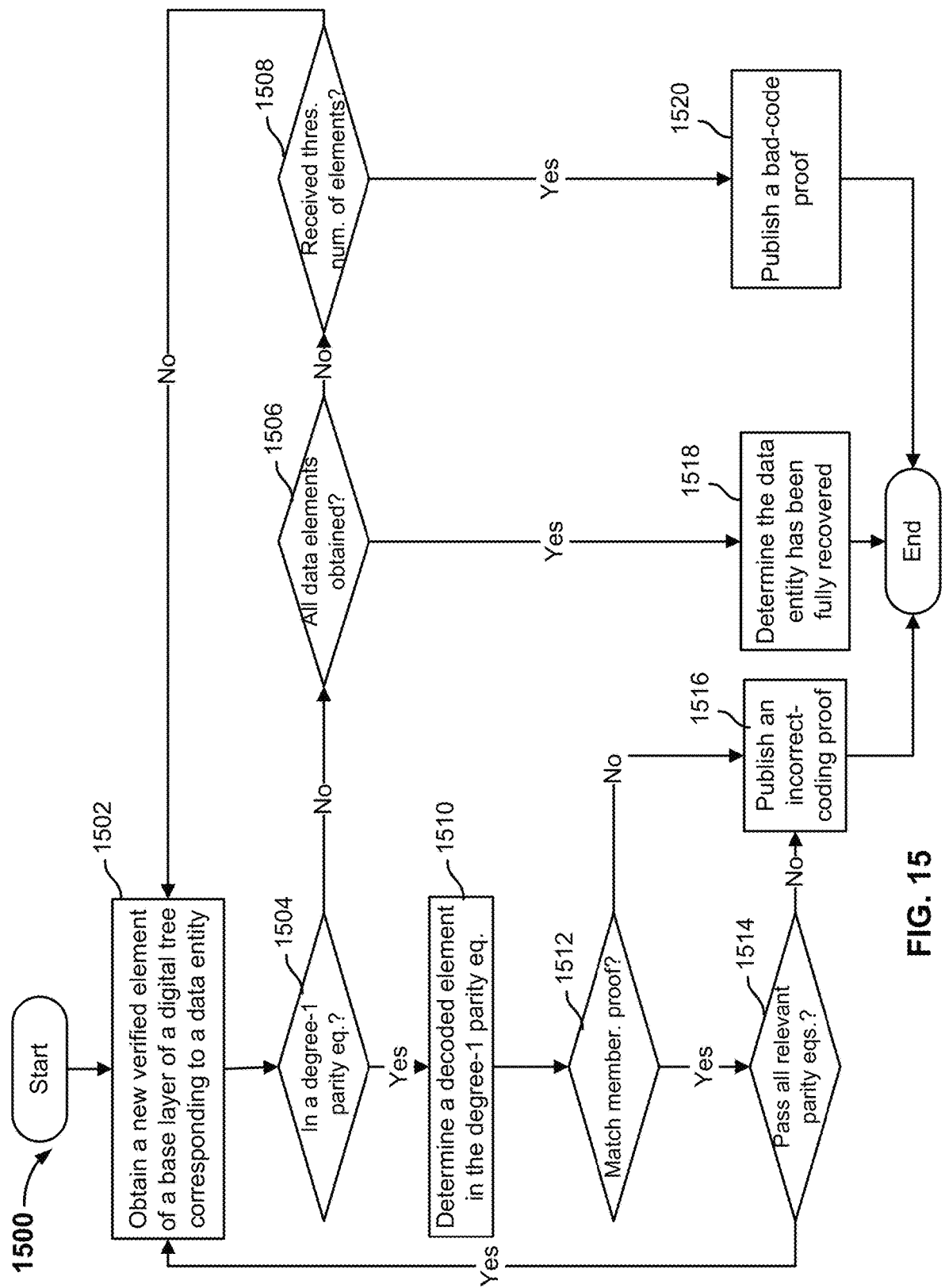
FIG. 15 is a flow diagram showing a first example of a process for auditing the data availability of a data entity in a network.

FIG. 15 is a flow diagram showing a first example of a process for auditing the data availability of a data entity in a network. In some embodiments, process 1500 may be implemented by a node in network 100 of FIG. 1. Specifically, in some embodiments, process 1500 may be implemented by a node that is performing an auditor role with respect to a data entity. In some embodiments, process 1100 of FIG. 11 may be performed, at least in part, by process 1500.

Process 1500 is an example process of iteratively decoding unknown elements in a base layer of a digital tree of a data entity by solving one parity equation in each iteration while progressively obtaining verified elements.

At 1502, a new verified element of a base layer of a digital tree corresponding to a data entity is obtained. A new verified element may be obtained from a verifier node in the network.

At 1504, whether the new verified element is part of a degree–1 parity equation associated with current parity matrix M is determined. In the event that the new verified element is part of a degree–1 parity equation, control is transferred to 1510. Otherwise, in the event that the new verified element is not part of a degree–1 parity equation, control is transferred to 1506. As mentioned above, a "degree–1" parity equation is a parity equation for which all but one element are already verified and obtained at an auditor node. It is determined whether the newly obtained verified element is part of a degree–1 parity equation.

At 1506, whether all data elements of the base layer of the digital tree have been obtained is determined. In the event that all data elements of the base layer of the digital tree have been obtained, control is transferred to 1518. Otherwise, in the event that fewer than all data elements of the base layer of the digital tree have been obtained, control is transferred to 1508. Where a (N, K) redundancy code is used to encode the data entity, there will be K data elements (and (N–K) parity elements) in the base layer of the digital tree. It is determined whether K data elements have been collected as verified elements and/or as decoded elements. The K data elements are the original partitions of the data entity.

At 1508, whether at least a threshold number of elements have been obtained is determined. In the event that at least the threshold number of elements have been obtained, control is transferred to 1520. Otherwise, in the event that fewer than the threshold number of elements have been obtained, control is returned to 1502. In some embodiments, the threshold number of elements is defined as $(1-\alpha^*)N$ elements, where $\alpha^*$ is the target stopping ratio and N is the total number of elements in the base layer of the digital tree of the data entity.

At 1510, a decoded element is determined in the degree–1 parity equation. Given that all but one element are verified and obtained/known to the degree–1 parity equation, the parity equation and the known elements are used to decode the last, remaining element.

At 1512, whether a digital signature of the decoded element matches its corresponding membership proof is determined. In the event that the digital signature of the decoded element matches its corresponding membership proof, control is transferred to 1514. Otherwise, in the event that the digital signature of the decoded element does not match its corresponding membership proof, control is returned to 1516. The digital signature is computed for the decoded element and then compared to the membership proof corresponding to the decoded element.

At 1514, whether the verified and decoded elements pass all relevant parity equations is determined. In the event that the verified and decoded elements pass all relevant parity equations, control is returned to 1502. Otherwise, in the event that the verified and decoded elements do not pass all relevant parity equations, control is transferred to 1516. The other parity equations that include the decoded element are checked for whether they hold with the decoded element.

At 1516, an incorrect-coding proof is published. In some embodiments, the incorrect-coding proof includes the failed parity equations, the elements that failed the parity equations, the elements whose digital signatures did not match their membership proofs, and/or the membership proofs of the elements that failed the parity equations or whose digital signatures did not match their membership proofs. Incorrect coding indicates that the producer node may have engaged in fraudulent activity by purposely encoding the data entity incorrectly.

At 1518, the data entity is determined to be fully recovered. If there are no more degree–1 parity equations and all K data elements are the original partitions of the data entity that have been obtained, then the entire data entity is recovered and the encoding of the digital tree is determined to be valid.

At 1520, a bad-code proof is published. Because K data elements should have been decoded once $(1-\alpha^*)N$ elements have been obtained, it is determined that the stopping ratio $\alpha$ is smaller than the target stopping ratio $\alpha^*$ and that therefore, the quality current parity matrix M is inadequate. The bad-code proof will include the indices of all the up to $\alpha^*N$ elements that it has not received. The indices of the bad-code proof are sometimes referred to as the "bad stopping set."

Figure 16:
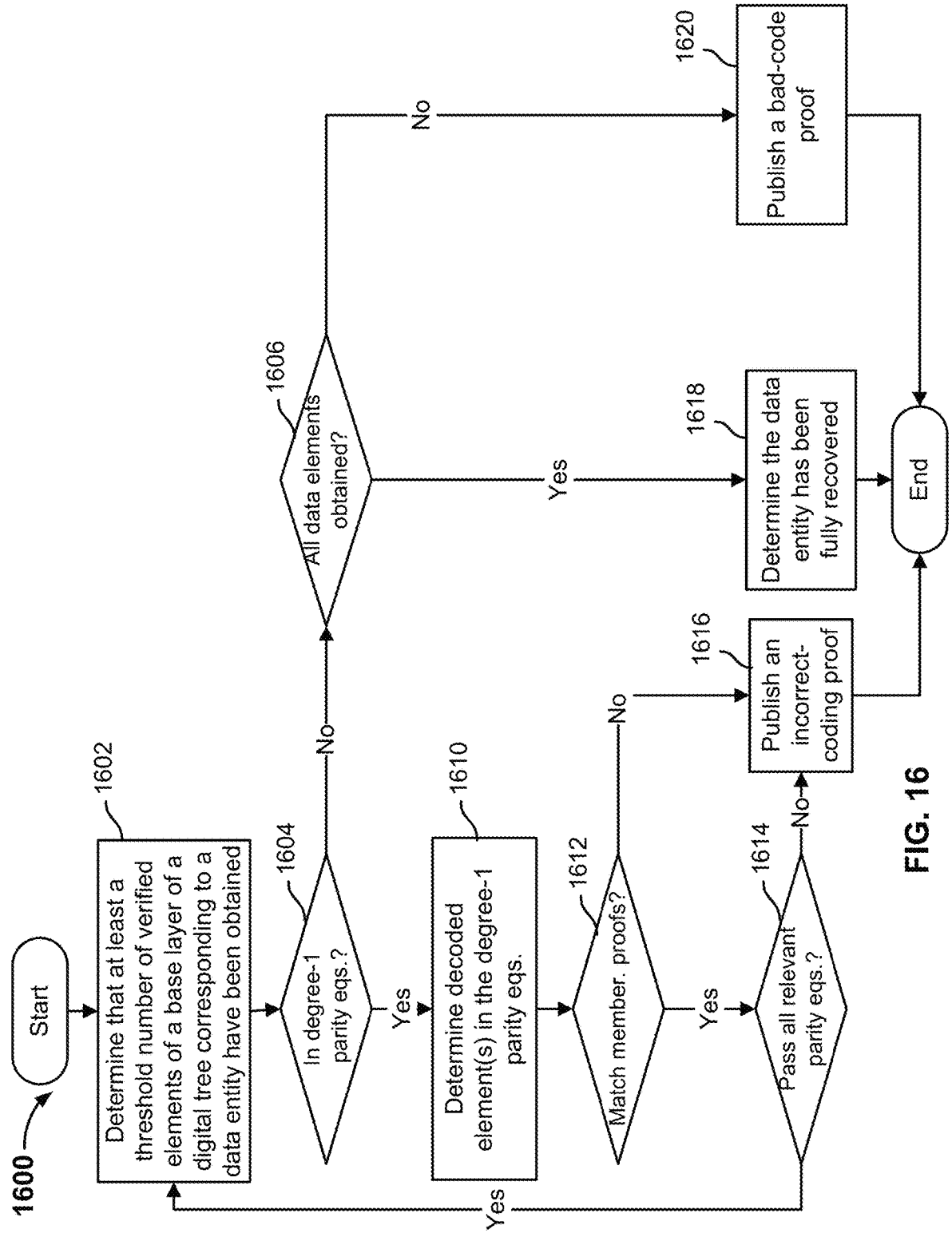
FIG. 16 is a flow diagram showing a second example of a process for auditing the data availability of a data entity in a network.

FIG. 16 is a flow diagram showing a second example of a process for auditing the data availability of a data entity in a network. In some embodiments, process 1600 may be implemented by a node in network 100 of FIG. 1. Specifically, in some embodiments, process 1600 may be implemented by a node that is performing an auditor role with respect to a data entity. In some embodiments, process 1100 of FIG. 11 may be performed, at least in part, by process 1600.

Process 1600 is an example process of iteratively decoding unknown elements in a base layer of a digital tree of a data entity by solving parity equation(s) in each iteration after waiting until at least a threshold number of elements have been obtained.

At 1602, it is determined that at least a threshold number of verified elements of a base layer of a digital tree corresponding to a data entity have been obtained. Unlike process 1500 of FIG. 15, in process 1600, the auditing/decoding process does not begin until a threshold number of elements are obtained at the auditor node. In some embodiments, the threshold number of elements is defined as $(1-\alpha^*)$ N elements, where $\alpha^*$ is the target stopping ratio and N is the total number of elements in the base layer of the digital tree of the data entity.

At 1604, whether the verified elements are parts of degree–1 parity equation(s) associated with current parity matrix M is determined. In the event that the verified elements are parts of degree–1 parity equation(s), control is transferred to 1610. Otherwise, in the event that verified elements are not parts of degree–1 parity equation(s), control is transferred to 1606. As mentioned above, a "degree–1" parity equation is a parity equation for which all but one element are already verified and obtained at an auditor node. It is determined for whether the verified elements are part of one or more degree-1 parity equations.

At 1606, whether all data elements of the base layer of the digital tree have been obtained is determined. In the event that all data elements of the base layer of the digital tree have been obtained, control is transferred to 1618. Otherwise, in the event that fewer than all data elements of the base layer of the digital tree have been obtained, control is transferred to 1620. Where a (N, K) redundancy code is used to encode the data entity, there will be K data elements (and (N-K) parity elements) in the base layer of the digital tree. It is determined whether K data elements have been collected as verified elements and/or as decoded elements. The K data elements are the original partitions of the data entity.

At 1610, decoded element(s) are determined in the degree-1 parity equations. Given that all but one element are verified and obtained/known to each degree-1 parity equation, the parity equation and the known elements are used to decode the last, remaining element for each such parity equation.

At 1612, whether digital signature(s) of the decoded element(s) match their corresponding membership proofs are determined. In the event that the digital signature(s) of the decoded element(s) match their corresponding membership proofs, control is transferred to 1614. Otherwise, in the event that the digital signature of at least one of the decoded element(s) does not match its corresponding membership proofs, control is returned to 1616. A respective digital signature is computed for each decoded element and then compared to the membership proof corresponding to the decoded element.

At 1614, whether the verified and decoded elements pass all relevant parity equations is determined. In the event that the verified and decoded elements pass all relevant parity equations, control is returned to 1602. Otherwise, in the event that the verified and decoded elements do not pass all relevant parity equations, control is transferred to 1616. The other parity equations that include the decoded element(s) are checked for whether they hold with the decoded element(s).

At 1616, an incorrect-coding proof is published. In some embodiments, the incorrect-coding proof includes the failed parity equations, the elements that failed the parity equations, the elements whose digital signatures did not match their membership proofs, and/or the membership proofs of the elements that failed the parity equations or whose digital signatures did not match their membership proofs. Incorrect coding indicates that the producer node may have engaged in fraudulent activity by purposely encoding the data entity incorrectly.

At 1618, the data entity is determined to be fully recovered. If there are no more degree-1 parity equations and all K data elements are the original partitions of the data entity that have been obtained, then the entire data entity is recovered and the encoding of the digital tree is determined to be valid.

At 1620, a bad-code proof is published. Because K data elements should have been decoded once $(1-\alpha^*)N$ elements have been obtained, it is determined that the stopping ratio $\alpha$ is smaller than the target stopping ratio $\alpha^*$ and that therefore, the quality current parity matrix M is inadequate. The bad-code proof will include the indices of all the up to $\alpha^*N$ elements that it has not received.

This decoding process, together with the constraint that the row weight of parity matrix M is at most d, guarantees that the size of the incorrect-coding proof is at most the size of d coded symbols plus their membership proofs.

The above process can be generalized, such that up to m parity equations are solved in each iteration for any m≥1. The size of an incorrect-coding proof will be upper bounded by the size of m*d elements plus their membership proofs.

FIG. 17 is a flow diagram showing an example of a process for determining whether to select a new parity matrix. In some embodiments, process 1700 may be implemented by a node in network 100 of FIG. 1.

At 1702, a bad-code proof is received. For example, a bad-code proof is generated by an auditor node in response to determining that the quality of the current parity matrix is inadequate.

At 1704, whether a bad-code condition is met is determined. In the event that the bad-code condition is not met, control is transferred to 1706. Otherwise, in the event that the bad-code condition is met, control is transferred to 1708. For example, the condition is whether the bad-code proof reveals a set of up to $\alpha^*N$ elements (as mentioned above, the up to $\alpha^*N$ elements is sometimes referred to as the "bad stopping set") that prevent decoding, where $\alpha^*$ is a pre-defined system parameter. For example, a verifier node that receives a bad-code proof will check whether the indices included in the proof form a bad stopping set. If so, then the code does in fact meet the bad-code condition.

At 1706, the bad-code proof is determined to be a fake proof. A "fake" proof is an inauthentic proof that may have been generated by a node for malicious reasons. A fake proof will therefore be disregarded and will not cause a new parity matrix to be generated.

At 1708, a new parity matrix is generated. Upon receiving a valid bad-code proof, interested nodes in the network will generate a new parity matrix M using the specified random matrix generation function and an agreed random seed. Since the random matrix generation function will always generate the same M under the same random seed, it is automatically guaranteed that the each M generated by different nodes is the same. In some embodiments, the agreed random seed is picked from a pre-defined number sequence. In some embodiments, the agreed random seed is derived using the previous data entities. In some embodiments, the agreed random seed is generated through a consensus protocol of the system.

In some other embodiments, the nodes in the network can run a certain consensus protocol to generate a new M, which will update the redundancy code.

In some embodiments, fake incorrect-coding proofs and fake bad-code proofs are demotivated through an incentive program. For example, the system could ask the auditor to put a large deposit with a proof. The deposit is forfeited if the proof is found fake. On the other hand, other nodes may tip the auditor node if they find the proof valid. The deposit and tips could be currency, credit, or any other forms of stakes that are accepted by the network.

Figure 18:
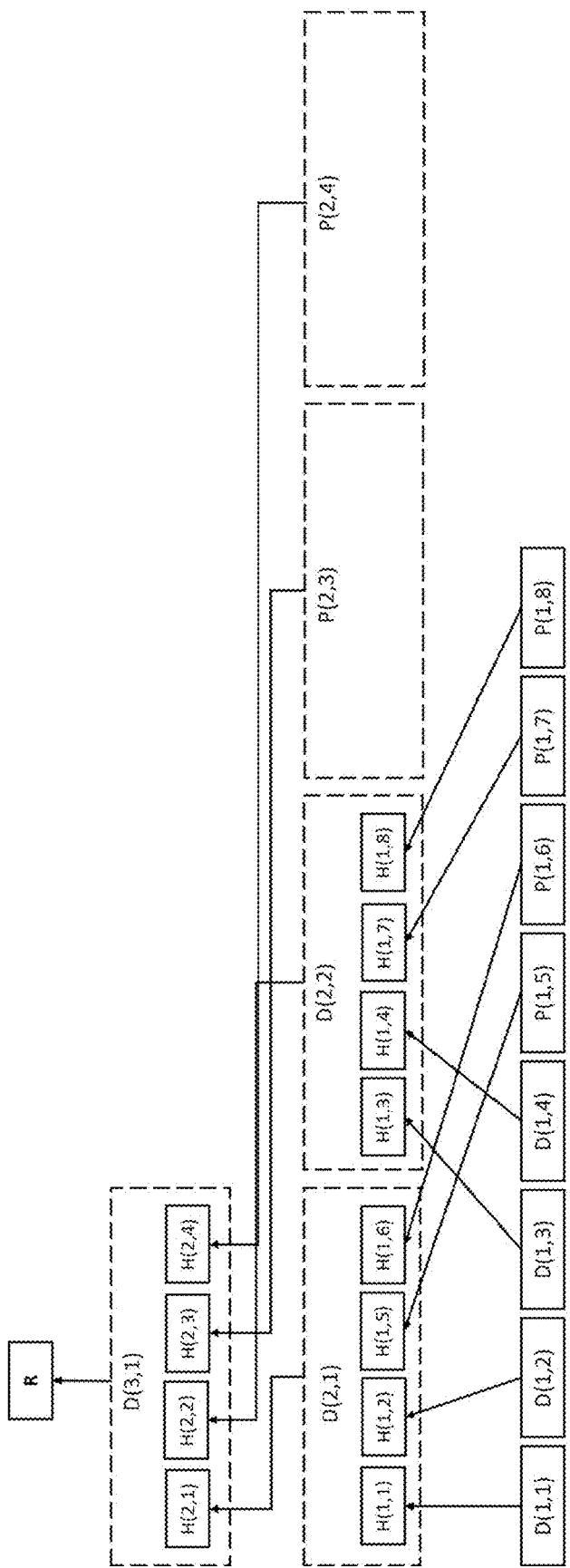
FIG. 18 demonstrates how to iteratively apply techniques described herein to allow the verifier nodes to check the availability of the membership proofs of all the N coded elements without fully downloading these membership proofs in accordance with some embodiments.

FIG. 18 demonstrates how to iteratively apply techniques described herein to allow the verifier nodes to check the availability of the membership proofs of all the N coded elements without fully downloading these membership proofs in accordance with some embodiments. In some embodiments, this problem is solved by treating the N digital signatures of the N coded elements as a new data entity, and apply an (N', K') redundancy code to this new data entity, where N'<N. FIG. 18 shows that each batch of digital signatures interleaves data elements and their parity elements in one layer to form a data element in a next (higher) layer in the digital signature tree. The result is a new coded data entity with N' coded elements (D(2,1), D(2,2), P(2,3), P(2,4) in the figure). Then, N' new digital signatures (H(2,1), H(2,2), H(2,3), H(2,4) in the figure) are generated using these N' new coded elements. The iteration continues until the size of the digital signatures generated in an iteration is smaller than a system predefined threshold T. Then these digital signatures in the last iteration are either directly used as the identifier R of the original data entity, or are concatenated and fed to a one-way function to generate the identifier R of the original data entity. This iterative encoding and digital signature generation process yields a tree-like layered data structure, where the original data entity is at the bottom layer and the identifier R is at the top layer. The membership proof of any coded element in any layer consists of all the sibling digital signatures between this coded element and the identifier R.

With this tree-like layered data structure, a verifier node only needs to fully download the identifier R and/or the T digital signatures at the top layer of the tree, and can determine the availability of every lower layer with high confidence through randomly sampling coded elements of this layer. For example, if the redundancy coding applied to this layer has a stopping ratio of a, then the confidence after randomly sampling s elements could be confidence=$1-(1-\alpha^*)^s$. Similarly, the auditor nodes will decode and audit the layers one by one from the top, and will publish an incorrect-coding proof or a bad-quality code proof to the network if any layer fails, which will allow other nodes to reject the data entity.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A first node, comprising:
   a processor configured to: perform a data availability challenge with respect to a second node to determine s whether the second node stores at least some elements included in a base layer in a digital tree corresponding to a data entity; and
   publish a first set of elements associated with the base layer of the digital tree and the data availability challenge, wherein an encoding validity determination of the digital tree is determined based at least in part on whether the first set of elements is usable to recover a second set of elements associated with the base layer of the digital tree, wherein the second set of elements associated with the base layer of the digital tree comprises partitions of the data entity; and
   a memory coupled to the processor and configured to store the first set of elements.

2. The first node of claim 1, wherein the digital tree is generated based at least in part on: is the data entity being divided into a set of partitions; and a redundancy code being applied to the set of partitions to generate a set of parity information, wherein the base layer of the digital tree includes the set of partitions and the set of parity information.

3. The first node of claim 1, wherein to perform the data availability challenge with respect to the second node comprises to: request a requested element of the base layer of the digital tree; receive the requested element; generate a digital signature based on the requested element; and compare the digital signature to a membership proof corresponding to the requested element.

4. The first node of claim 3, wherein the processor is further configured to: determine that the requested element is verified based on the digital signature matching the membership proof corresponding to the requested element; determine an updated confidence level that the data entity is fully available in a network based at least in part on a number of verified elements; and determine whether the updated confidence level is greater than a verification confidence level threshold.

5. The first node of claim 1, wherein the processor is further configured to: obtain an identifier corresponding to the data entity; obtain a set of membership proofs corresponding to elements in the base layer of the digital tree; and determine whether the set of membership proofs can be verified based at least in part on whether the set of membership proofs can reproduce the identifier corresponding to the data entity.

6. A method, comprising:
   performing a data availability challenge with respect to a claimer node to determine whether the claimer node stores at least some elements included in a base layer in a digital tree corresponding to a data entity; and
   publishing a first set of elements associated with the base layer of the digital tree and the data availability challenge, wherein an encoding validity determination of the digital tree is determined based at least in part on whether the first set of elements is usable to recover a second set of elements associated with the base layer of the digital tree, wherein the second set of elements associated with the base layer of the digital tree comprises partitions of the data entity.

7. The method of claim 6, wherein the digital tree is generated based at least in part on: the data entity being divided into a set of partitions; and a redundancy code being applied to the set of partitions to generate a set of parity information, wherein the base layer of the digital tree includes the set of partitions and the set of parity information.

8. The method of claim 6, wherein performing the data availability challenge with respect to the claimer node comprises: requesting a requested element of the base layer of the digital tree; receiving the requested element; generating a digital signature based on the requested element; and comparing the digital signature to a membership proof corresponding to the requested element.

9. The method of claim 8, further comprising: determining that the requested element is verified based on the digital signature matching the membership proof corresponding to the requested element; determining an updated confidence level that the data entity is fully available in a network based at least in part on a number of verified elements; and determining whether the updated confidence level is greater than a verification confidence level threshold.

10. The method of claim 6, further comprising: obtaining an identifier corresponding to the data entity; obtaining a set of membership proofs corresponding to elements in the base layer of the digital tree; and determining whether the set of membership proofs can be verified based at least in part on whether the set of membership proofs can reproduce the identifier corresponding to the data entity.

* * * * *

UNITED STATES PATENT AND TRADEMARK OFFICE
CERTIFICATE OF CORRECTION

PATENT NO. : 11,533,127 B1
APPLICATION NO. : 16/776291
DATED : December 20, 2022
INVENTOR(S) : Mingchao Yu et al.

Page 1 of 1

It is certified that error appears in the above-identified patent and that said Letters Patent is hereby corrected as shown below:

On the Title Page

In page 2, Column 1, Item (56), U.S. patent documents, cite no. 5, delete "Fin", and insert --FINLOW-BATES--, therefor.

In the Specification

In Column 6, Line(s) 32, after "hide", delete "a", and insert --α--, therefor.
In Column 15, Line(s) 30, after "one element", delete "are", and insert --is--, therefor.
In Column 15, Line(s) 56, after "one element", delete "are", and insert --is--, therefor.
In Column 17, Line(s) 18, after "one element", delete "are", and insert --is--, therefor.

Signed and Sealed this
Thirteenth Day of June, 2023

Katherine Kelly Vidal
*Director of the United States Patent and Trademark Office*